United States Patent
O'Brien et al.

(10) Patent No.: US 12,511,410 B1
(45) Date of Patent: Dec. 30, 2025

(54) PHYSICAL LAYER SECURITY

(71) Applicant: QDAComm LLC, Raleigh, NC (US)

(72) Inventors: John O'Brien, Chatham, NJ (US); Paulo Carvalho, Lisbon (PT); Rui Dinis, Costa da Caparica (PT)

(73) Assignee: QDAComm LLC, Raleigh, NC (US)

( * ) Notice: Subject to any disclaimer, the term of this patent is extended or adjusted under 35 U.S.C. 154(b) by 0 days.

(21) Appl. No.: 19/204,003

(22) Filed: May 9, 2025

Related U.S. Application Data

(63) Continuation-in-part of application No. 19/072,598, filed on Mar. 6, 2025.

(51) Int. Cl.
- H04M 1/66 (2006.01)
- G06F 21/60 (2013.01)
- H04L 1/00 (2006.01)
- H04W 12/041 (2021.01)

(52) U.S. Cl.
CPC .......... *G06F 21/606* (2013.01); *H04L 1/0068* (2013.01); *H04W 12/041* (2021.01)

(58) Field of Classification Search
CPC ....... G06F 21/606; H04W 12/03; H04L 63/16
See application file for complete search history.

(56) References Cited

U.S. PATENT DOCUMENTS

| | | | |
|---|---|---|---|
| 3,777,275 A | 12/1973 | Cox | |
| 3,927,379 A | 12/1975 | Cox et al. | |
| 5,304,943 A | 4/1994 | Koontz | |
| 5,872,481 A | 2/1999 | Sevic et al. | |
| 6,208,247 B1 | 3/2001 | Agre et al. | |
| 6,320,914 B1 | 11/2001 | Dent | |
| 6,359,504 B1 | 3/2002 | Cozzarelli | |
| 6,470,055 B1 | 10/2002 | Feher | |
| 7,260,368 B1 | 8/2007 | Blumer | |
| 7,272,408 B2 | 9/2007 | Dalal et al. | |
| 7,480,395 B2 | 1/2009 | Parunak et al. | |
| 7,526,261 B2 | 4/2009 | Sorrells et al. | |
| 7,629,843 B2 | 12/2009 | Paul et al. | |
| 7,715,811 B2 | 5/2010 | Kenington | |
| 7,729,675 B2 | 6/2010 | Krone | |
| 7,737,786 B2 | 6/2010 | Plaze et al. | |
| 7,889,811 B2 | 2/2011 | Byun et al. | |
| 7,937,049 B2 | 5/2011 | Phillips et al. | |
| 7,941,157 B2 | 5/2011 | Srinivasan et al. | |
| 7,979,574 B2 | 7/2011 | Gillo et al. | |
| 8,289,084 B2 | 10/2012 | Morimoto et al. | |

(Continued)

OTHER PUBLICATIONS

Orthogonal Waveforms and Filter Banks for Future Communication Systems, Edition: 1st, Chapter: 18, pp. 462-485, Elsevier, 2009.

(Continued)

*Primary Examiner* — Shantell L Heiber
(74) *Attorney, Agent, or Firm* — Kaufman & Canoles P.C.

(57) ABSTRACT

Systems and methods of performing physical layer security are presented. In one exemplary embodiment, an electronic device includes a set of amplifier circuitry operable to output a set of output signals that collectively represents an amplified sample of an input signal having information. Further, the set of output signals corresponds to a set of bandpass components that is secured by a certain physical layer security scheme and is associated with a quantized polar representation of the input signal sample.

18 Claims, 10 Drawing Sheets

(56) References Cited

U.S. PATENT DOCUMENTS

| | | | |
|---|---|---|---|
| 8,299,266 | B2 | 10/2012 | Parlanti et al. |
| 8,362,832 | B2 | 1/2013 | Kim et al. |
| 8,451,053 | B2 | 5/2013 | Perreault et al. |
| 9,012,415 | B2 | 4/2015 | Da Silva Correia et al. |
| 9,020,453 | B2 | 4/2015 | Briffa et al. |
| 9,166,528 | B2 | 10/2015 | Sorrells et al. |
| 9,413,303 | B2 | 8/2016 | Mostov et al. |
| 9,438,172 | B2 | 9/2016 | Cohen |
| 9,537,456 | B2 | 1/2017 | Briffa et al. |
| 9,749,786 | B1 | 8/2017 | Pandey et al. |
| 10,069,467 | B1 | 9/2018 | Carvalho et al. |
| 10,338,193 | B2 | 7/2019 | Beko et al. |
| 10,511,359 | B2 | 12/2019 | Carvalho et al. |
| 10,597,316 | B2 | 3/2020 | Gomes De Oliveira et al. |
| 11,095,253 | B2 | 8/2021 | Carvalho et al. |
| 11,211,900 | B2 | 12/2021 | Carvalho et al. |
| 11,265,200 | B2 | 3/2022 | Carvalho et al. |
| 2001/0016013 | A1 | 8/2001 | Feher |
| 2003/0174018 | A1 | 9/2003 | Cooper et al. |
| 2003/0215023 | A1 | 11/2003 | Chang et al. |
| 2004/0202255 | A1 | 10/2004 | Dallal |
| 2004/0243258 | A1* | 12/2004 | Shattil ............... H04L 27/265 700/55 |
| 2005/0032483 | A1 | 2/2005 | Klomsdorf et al. |
| 2006/0006945 | A1 | 1/2006 | Burns et al. |
| 2006/0009227 | A1* | 1/2006 | Cudak ............... H04W 16/18 455/450 |
| 2007/0223622 | A1 | 9/2007 | Bang et al. |
| 2007/0293237 | A1 | 12/2007 | Correal et al. |
| 2009/0190633 | A1* | 7/2009 | Smith ............... H04B 1/123 375/346 |
| 2009/0311980 | A1 | 12/2009 | Sjoland |
| 2010/0265799 | A1 | 10/2010 | Cevher et al. |
| 2011/0038440 | A1 | 2/2011 | Balbach et al. |
| 2011/0187437 | A1 | 8/2011 | Perrault et al. |
| 2012/0326927 | A1 | 12/2012 | Nikkels |
| 2013/0021104 | A1 | 1/2013 | Schmidt |
| 2013/0301454 | A1 | 11/2013 | Seol et al. |
| 2014/0062793 | A1 | 3/2014 | AlSindi et al. |
| 2014/0350237 | A1 | 11/2014 | da Silva Correia et al. |
| 2015/0221313 | A1 | 8/2015 | Purnhagen et al. |
| 2015/0288437 | A1 | 10/2015 | Raju et al. |
| 2016/0164466 | A1 | 6/2016 | Briffa et al. |
| 2017/0090025 | A1 | 3/2017 | Wang |
| 2017/0279501 | A1 | 9/2017 | Kim et al. |
| 2017/0280281 | A1 | 9/2017 | Pandey et al. |
| 2017/0346559 | A1 | 11/2017 | Eroglu et al. |
| 2018/0138862 | A1 | 5/2018 | Balteanu et al. |
| 2019/0149519 | A1* | 5/2019 | Bajekal ............... H04L 63/04 726/4 |
| 2020/0403839 | A1* | 12/2020 | Carvalho ............... H03F 3/189 |
| 2021/0006207 | A1 | 1/2021 | Carvalho et al. |
| 2021/0359651 | A1 | 11/2021 | Carvalho et al. |
| 2021/0377728 | A1* | 12/2021 | Min ............... H04W 12/037 |
| 2023/0262036 | A1* | 8/2023 | Hua ............... H04L 63/0485 713/153 |
| 2024/0031211 | A1* | 1/2024 | Meir ............... H04L 27/368 |
| 2024/0220570 | A1* | 7/2024 | Lee ............... G06F 17/142 |

OTHER PUBLICATIONS

P. Laurent, "Exact and approximate construction of digital phase modulation by superposition of amplitude modulation pulses (AMP)", IEEE Transactions, COM-34, pp. 150-160, Feb. 1986.

P. Montezuma et al., "Quantized Digital Amplification with combination over the air—Achieving maximum efficiency on communication links between long range UAVs and satellites," MILCOM 2021—2021 IEEE Military Communications Conference (MILCOM), San Diego, CA, USA, 2021, pp. 802-807.

P. Montezuma, A. Gusmao, "A pragmatic coded modulation choice for future broadband wireless communications", IEEE VTC'01 (Spring), Rhodes, Greece, May 2001.

P. Montezuma, A. Gusmao, "Design of TC-OQAM schemes using a generalized nonlinear OQPSK-type format", Electronic Letters, vol. 35, Issue 11, pp. 860/861, 1999.

P. Reynaert and A. M. Niknejad, "Power combining techniques for RF and mm-wave CMOS power amplifiers," ESSCIRC 2007—33rd European Solid-State Circuits Conference, Munich, Germany, 2007, pp. 272-275.

P. Reynaert and M. Steyaert, RF Power Amplifiers for Mobile Communications, Springer, 2006.

P. S. K. Leung and K. Feher, "F-QPSK—a superior modulation technique for mobile and personal communications", IEEE Trans. Broadcast., vol. 39, pp. 288-294, Jun. 1993.

Paulo Montezuma et al. (Power Efficient Coded 16-OOAM Schemes over Nonlinear Transmitters, 34th IEEE Sarnoff Symposium, May 3-4, 2011. Princeton, NJ, USA.

R. Dinis, A. Gusmao and N. Esteves, "On broadband block transmission over strongly frequency-selective fading channels", IEEE VVireless'03, Calgary, Canada, Jul. 2003.

R. Dinis, A. Gusmao, Nonlinear signal processing schemes for OFDM modulations within conventional or LINO transmitter structures, [in:] European Transactions on Telecommunications, Vo. 19, No. 3, pp. 257-271, Apr. 2008.

R. Dinis, P. Montezuma, N. Souto, J. Silva, Iterative Frequency-Domain Equalization for General Constellations, 33rd IEEE Sarnoff Symposium 2010, Princeton, USA,—Apr. 2010.

R. V. Nee and R. Prasad, OFDM for Wireless Multimedia Communications, 1st ed. Norwood, MA, USA: Artech House, Inc., 2000.

Rangan, S., T.S. Rappaport, and E. Erkip, "Millimeter-wave cellular wireless networks: Potentials and challenges", Proc. IEEE, vol. 102, No. 3, pp. 366-385, Mar. 2014.

Rappaport, T.S., et al., "Millimeter wave mobile communications for 5G cellular: it will work!", IEEE Access, vol. 1, pp. 335-349, May 2013.

S. C. Cripps, RF Power Amplifiers for Wireless Communications. Artech House, 2006.

S. Kousai and A. Hajimiri, "An octave-range watt-level fully-integrated cmos switching power mixer array for linearization and back-off-efficiency improvement", IEEE Journal of Solid-State Circuits, vol. 44, No. 12, pp. 3376-3392, 2009.

S. Shambayati, D. K. Lee, "GMSK modulation for deep space applications", IEEE Aerospace Conference, Montana, USA, Mar. 2012.

Said, H.A., et al., Design and Realization of Digital Pulse Compression in Pulsed Radars Based on Linear Frequency Modulation (LFM) Waveforms Using FPGA, International Conference on Advanced Information and Communication Technology for Education (ICAICTE 2013).

Sim, Jaewoo, et al., Analysis and Design of Doherty Power Amplifiers for Digital Pre-distortion Linearizer, Proceedings of Asia-Pacific Microwave Conference 2007.

Sundeep Rangan et al. (Millimeter-Wave Cellular Wireless Networks: Potentials and Challenges, Proceedings of the IEEE I vol. 102, No. 3, Mar. 2014).

T. Aulin, N. Rydbeck and C. Sundberg, "Continuous phase modulation—Part II: Partial response signaling", IEEE Transactions on Communications, Vo. COM-29, pp. 210-215, Mar. 1981.

T. J. Hill, "A non-proprietary, constant envelope, variant of shaped offset QPSK (SOQPSK) for improved spectral containment and detection efficiency", IEEE MILCOM Conference Record, vol. 1, pp. 347-352, California, USA, Oct. 2000.

T. Lee, S. Wang, C. Liu, "FQPSK-O: An improved performance constant envelope modulation scheme for OQPSK", IEEE International Telemetering Conference, San Diego, USA, 1998.

T.S. Rappaport, et al., Milirneter wave mobile communications for 5g cellular: it will work, [in:i Access, IEEE, vol. 1, pp. 335-249, 2013.

W. K. Harrison, J. Almeida, M. R. Bloch, S. W. McLaughlin, and J. Barros, "Coding for secrecy: An overview of error-control coding techniques for physical-layer security", IEEE Signal Process. Mag., vol. 30, No. 5, pp. 41-50, Sep. 2013.

W. Struble, F. McGrath, K. Harrington, P. Nagle and S. Rand, "Understanding linearity in wireless communication amplifiers,"

(56) References Cited

OTHER PUBLICATIONS

GaAs IC Symposium IEEE Gallium Arsenide Integrated Circuit Symposium. 18th Annual Technical Digest 1996, Orlando, FL, USA, 1996.
W. Yuan, Jeffrey S. Walling, "A Multiphase Switched Capacitor Power Amplifier" in IEEE Journal of Solid-State Circuits, vol. 52, No. 5, May 2017 pp. 1320-1330.
W. Yuan, V. Aparin, J. Dunworth, L. Seward and J. S. Walling, "A Quadrature Switched Capacitor Power Amplifier," in IEEE Journal of Solid-State Circuits, vol. 51, No. 5, pp. 1200-1209, May 2016.
Wang, Feipeng, et al., A Monolithic High-Efficiency 2.4-GHz 20-dBm SiGe BiCMOS Envelope-Tracking OFDM Power Amplifier, IEEE Journal of Solid-State Circuits, vol. 42, No. 6, Jun. 2007.
Wang, Feipeng, et al., Design of Wide-Bandwidth Envelope-Tracking Power Amplifiers for OFDM Applications, IEEE Transactions on Microwave Theory and Techniques, vol. 53, No. 4, Apr. 2005.
Wang, Feipeng, et al., Wideband Envelope Elimination and Restoration Power Amplifier with High Efficiency Wideband Envelope Amplifier for WLAN 802.11g Applications, IEEE 2005.
Wang, Zhancang, Demystifying Envelope Tracking, IEEE, Mar. 6, 2015.
Wolf, Robert, et al., On the Maximum Efficiency of Power Amplifiers in OFDM Broadcast Systems with Envelope Following, MobiLight 2010, LNICST 45, pp. 160-170, 2010.
Y. Li, W. Li, Y. Wang, W. Luo, Y. Lin and H. Xu, "A Compact 144% Fractional Bandwidth CMOS Power Amplifier With an Optimization of Synthesized High-Order Matching Network," 2023 IEEE 15th International Conference on Asic (ASICON), Nanjing, China, 2023, pp. 1-4.
Zhu, Anding, Decomposed Vector Rotation-Based Behavioral Modeling for Digital Predistortion of RF Power Amplifiers, IEEE Transactions on Microwave Theory and Techniques, vol. 63, No. 2, Feb. 2015.
Zhu, Anding, et al., Open-Loop Digital Predistorter for RF Power Amplifiers Using Dynamic Deviation Reduction-Based Volterra Series, IEEE Transactions on Microwave Theory and Techniques, vol. 56, No. 7, Jul. 2008.
Cappello, Tommaso, et al., Lineraziation of a 500-W L-band GaN Doherty Power Amplifier by Dual-Pulse Trap Characterization, 2019 IEEE/MTT-S International Microwave Symposium.
Technical White Paper, Unitary Braid Division Multiplexing High-performance, zero-attack-surface wireless, Rampart Communications.
A Gusmao and N. Esteves, "ENCAP-4: an OQPSK-type modulation technique for digital radio", IEEE Proc. I, Commun. Speech Vis., vol. 135, No. 1, pp. 105-110, Feb. 1988.
A. Araujo, J. Blesa, E. Romero, and O. Nieto-Taladriz, "Artificial noise scheme to ensure secure communications in CWSN," in Proc. 8th Int. Wireless Commun. Mobile Comput. Conf., Limassol, Cyprus, Aug. 2012, pp. 1023-1027.
A. Barenghi, L. Breveglieri, I. Koren, and D. Naccache, "Fault injection attacks on cryptographic devices: Theory, practice, and countermeasures", Proc. IEEE, vol. 100, No. 11, pp. 3056-3076, Nov. 2012.
A. Birafane, M. El-Asmar et al., Analyzing LINC Systems, [in:] Microwave Magazine, IEEE, vol. 11, No. 5, pp. 59-71, Aug. 2010.
A. Gusmao, V. Goncalves, N. Esteves, "A novel approach to modeling of OQPSK type digital transmission over nonlinear radio channels", in IEEE Journal on Selected Areas in Communications, Vo. 15, No. 4, pp. 647-655, 1997.
Alekajbaf Y, Masoumi N, Mohammad-Taheri M, Safavi-Naeini S. A 200 W broadband high power amplifier using hybrid power combining network and digital level control. Int J RF Microw Comput Aided Eng. 2020.
Aoki, S. D. Kee, D. B. Rutledge, and A. Hajimiri, "Fully Integrated CMOS Power Amplifier Design Using the Distributed Active Transformer Architecture," IEEE J. Solid-State Circuits, vol. 37, No. 3, pp. 371-383, Mar. 2002.
Astucia et al. (Efficient Amplification and Detection of Multilevel SC-FDE Signals Based on BPSK Components, 2013 IEEE Military Communications Conference).
B. Schneier, "Cryptographic design vulnerabilities", IEEE Computer, vol. 31, No. 9, pp. 26-33, Sep. 1998.
Barton, Taylor W., et al., Theory and Implementation of RF-Input Outphasing Power Amplification, IEEE Transactions on Microwave Theory and Techniques, vol. 63, No. 12, pp. 4273-4283, Dec. 2015.
Benvenuto, Nevio et al., Single Carrier Modulation With Nonlinear Frequency Domain Equalization: An Idea Whose Time Has Come—Again, Proceedings of the IEEE, vol. 98, No. 1, Jan. 2010.
C.-F. Chou, Y.-H. Hsiao, Y.-C. Wu, Y.-H. Lin, C.-W. Wu, and H. Wang, "Design of a V-band 20-dBm wideband power amplifier using transformer-based radial power combining in 90-nm CMOS," IEEE Trans. Microwave Theory and Tech, vol. 64, No. 12, pp. 4545-4560, Dec. 2016.
Cao, Tao, et al., S-band 34.2dBm Envelope-Tracking Transmitter with 54% Overall Efficiency Utilizing the High Efficiency and Wideband Envelope Amplifier, IEEE 2019.
Cao, Wenhui, et al., A Modified Decomposed Vector Rotation-Based Behavioral Model With Efficient Hardware Implementation for Digital Predistortion of RF Power Amplifiers, IEEE Transactions on Microwave Theory and Techniques, vol. 65, No. 7, Jul. 2017.
Carvalho, Paulo, Marko Beko, Rui Dinis, Joao Guerreiro, and Pedro Viegas. "Apparatus for quantized linear amplification with nonlinear amplifiers." U.S. Pat. No. 10,069,467, issued Sep. 4, 2018.
Chen, Chi-Tsan, Kahn Envelope Elimination and Restoration Technique Using Injection-Locked Oscillators, IEEE 2012.
Cox, D.C., Linear Amplification with Nonlinear Components, IEEE Transactions on Communications, Dec. 1974.
D. Falconer, S. Ariyavisitakul, A. Benyamin-Seeyar, and B. Eidson, "Frequency domain equalization for single-carrier broadband wireless systems", Communications Magazine, IEEE, vol. 40, No. 4, pp. 58-66, Apr. 2002.
D. Kim, D. Kang, J. Kim, Y. Cho, and B. Kim, "Wideband envelope tracking power amplifier for LTE application", Proc. IEEE Radio Freq. Integr. Circuits Symp. (RFIC), Jun. 2012, pp. 275-278.
Doherty, W.H., A New High-Efficiency Power Amplifier for Modulated Waves, IEEE.
E. Yacoub and M. Al-Husseini, "Achieving physical layer security with massive MIMO beamforming." 2017 11th European Conference on Antennas and Propagation (EUCAP), Paris, France, 2017, pp. 1753-1757.
Falconer, David, et al., Frequency Domain Equalization for Single-Carrier Broadband Wireless Systems, IEEE Communications Magazine, Apr. 2002.
Giannini, Franco, et al., The Doherty Amplifier: Past, Present & Future, IEEE 2015.
Gouba, Abel O., Y. Louet, "Theoretical analysis of the trade-off between efficiency and linearity of the high power amplifier in OFDM context", Proc. Eur. Wireless Conf., Apr. 2012, pp. 1-7.
Gustaffson, David, et al., A GaN MMIC Modified Doherty PA With Large Bandwidth and Reconfigurable Efficiency, IEEE Transactions on Microwave Theory and Techniques, vol. 62, No. 12, Dec. 2014.
H. C. Park, K. Lee and K. Feher, "Continuous phase modulation of spectrally efficient FQPSK signals", IEEE Vehicular Technology Conference, 1988, Philadelphia, PA, USA.
H. Tsai, W.-H. Liu, P.-C. Shen and W.-L. Huang, "A X-Band Fully-Integrated CMOS Power Amplifier using Current Combining Technique," 2019 IEEE 8th Global Conference on Consumer Electronics (GCCE), Osaka, Japan, 2019, pp. 411-412.
H. Wang, C. Sideris and A. Hajimiri, "A CMOS Broadband Power Amplifier With a Transformer-Based High-Order Output Matching Network," in IEEE Journal of Solid-State Circuits, vol. 45, No. 12, pp. 2709-2722, Dec. 2010.
Himanshu Sharma, Neeraj Kumar, Rajkumar Tekchandani, "Physical layer security using beamforming techniques for 5G and beyond networks: A systematic review", Elsevier, Physical Communication, vol. 54, 2022.
Hsiao-Hwa Chen, The next generation of CDMA techniques, John Wiley & Sons, 2007.

(56) References Cited

OTHER PUBLICATIONS

J. C. Pedro, N.B.C. Carvalho, C. Fager and J. A. Garcia, "Linearity versus efficiency in mobile handset power amplifiers: A battle without a loser", Microwave Engineering Europe, pp. 19-26, Aug. 2004.

J.-K. Wang, Y.-H. Lin, Y.-H. Hsiao, K.-S. Yeh and H. Wang, "A V-band power amplifier with transformer combining and neutralization technique in 40-nm COMS," 2017 IEEE International Symposium on Radio-Frequency Integration Technology (RFIT), Seoul, Korea (South), 2017, pp. 113-116.

J. L. Massey, "An introduction to contemporary cryptology", Proc. IEEE, vol. 76, No. 5, pp. 533-549, May 1988.

J. S. Walling, S.-M. Yoo and D. J. Allstot, "Digital power amplifier. A new way to exploit the switched-capacitor circuit," in IEEE Communications Magazine, vol. 50, No. 4, pp. 145-151, Apr. 2012.

J. Wu and J. Chen, "Multiuser transmit security beamforming in wireless multiple access channels," in Proc. IEEE Int. Conf. Commun., Ottawa, Canada, ON, Jun. 2012, pp. 903-906.

K. Guo, P. Huang and K. Kang, "A 60-GHz 1.2 V 21 dBm power amplifier with a fully symmetrical 8-way transformer power combiner in 90 nm CMOS", IEEE MTT-S Int. Microw. Symp. Dig., Jun. 2014.

K. Murota and K. Hirade, "GMSK Modulation for Digital Mobile Radio Telephony", IEEE Transactions on Communications, vol. 29, Issue 7, pp. 1044-1050, Jul. 1981.

Kim, J., et al., Digital predistortion of wideband signals based on power amplifier model with memory, IEEE 2001.

Kousai, S. and A. Hajimiri, "An octave-range, watt-level, fully-integrated CMOS switching power mixer array for linearization and back-off-efficiency improvement," IEEE J. Solid-State Circuits, vol. 44, No. 12, pp. 3376-3392, Dec. 2009.

L. Zhang, L.-L. Kuang, Z.-Y. Ni, and J.-H. Lu, "Performance evaluation for OFDM and SC-FDE systems with high power amplifier", Proc. IET Int. Commun. Conf. Wireless Mobile Comput. (CCWMC), Dec. 2009, pp. 348-352.

Li, Yan, et al., Design of High Efficiency Monolithic Power Amplifier With Envelope-Tracking and Transistor Resizing for Broadband Wireless Applications, IEEE Journal of Solid-State Circuits, vol. 47, No. 9, Sep. 2012.

M. Bellanger, FBMC physical layer: A primer, [in] ICT-PHYDYAS, Tech. Rep., pp. 1-31, 2010.

M. K. Simon and D. Divsalar, "A Reduced Complexity Highly Power Bandwidth Efficient Coded Feher-Patented Quadrature-Phase-Shift-Keying System with Iterative Decoding", JPL Progress report, vol. 145, No. 42, pp. 1-17, May 2001.

M. K. Simon, T. Yan, "Performance Evaluation and Interpretation of Unfiltered Feher-Patented Quadrature Phase-Shift Keying (FQPSK)", California Institute of Technology, JPL-NASA Publication, TMD Progress Report California, May 15, 1999. 42-137, Pasadena.

M. M. Assefzadeh and A. Babakhani, "Multi-order transmission line-radial stub networks for broadband impedance matching and power combining in a watt-level silicon power amplifier," 2016 Texas Symposium on Wireless and Microwave Circuits and Systems (WMCS), Waco, TX, USA, 2016, pp. 1-3.

Morgan, Dennis R., et al., A Generalized Memory Polynomial Model for Digital Predistortion of RF Power Amplifiers, IEEE Transactions on Signal Processing, vol. 54, No. 10, Oct. 2006.

N. Anand, S.-J. Lee, and E. W. Knightly, "Strobe: Actively securing wireless communications using zero-forcing beamforming," in 2012 Proceedings IEEE INFOCOM, Mar. 2012, pp. 720-728.

N. Benvenuto, R. Dinis, D. Falconer, and S. Tomasin, "Single carrier modulation with nonlinear frequency domain equalization: An idea whose time has come again", Proceedings of the IEEE, vol. 98, No. 1, pp. 69-96, Jan. 2010.

O. Abel Gouba, Y. Louet, "Theoretical analysis of the trade-off between efficiency and linearity of the high power amplifier in OFDM context", Proc. Eur. Wireless Conf., Apr. 2012, pp. 1-7.

O. Cepheli, T. Maslak, and G. Kurt, "Analysis on the effects of artificial noise on physical layer security," Signal Process. Commun. Appl. Conf., Haspolat, Turkey, Apr. 2013, pp. 1-4.

\* cited by examiner

PHYSICAL LAYER SECURITY

CROSS REFERENCE TO RELATED APPLICATIONS

This application is a continuation-in-part of U.S. patent application Ser. No. 19/072,598, filed Mar. 6, 2025, which is hereby incorporated by reference as if fully set forth herein.

FIELD OF THE DISCLOSURE

The present disclosure relates generally to physical layer security and more specifically to physical layer security such as that enabled by a coded decomposition of digital samples of time variant envelope signals into mapping components for energy optimization of transceiver front ends.

BACKGROUND

Wireless communications are prone to interception of wirelessly transmitted signals by unauthorized wireless devices. Due to the sharing nature of a wireless communication channel, other wireless devices that are present on the same wireless communication channel at transmission may have access to the transmitted data. Accordingly, there is a need for improved techniques to avoid unauthorized or unwanted interception of transmitted data on a wireless communication channel. In addition, other desirable features and characteristics of the present disclosure will become apparent from the subsequent detailed description and embodiments, taken in conjunction with the accompanying figures and the foregoing technical field and background.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

BRIEF SUMMARY OF THE DISCLOSURE

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

In this disclosure, a system of providing physical security with codified amplification is provided. According to one aspect, a system can receive samples $s_n=s(t_n)=S_{I,n}+js_{Q,n}$ of a baseband signal $s(t)$ at sampling instants $t_n$ of the sampled in-phase and quadrature-phase components of the baseband signal $s(t)$, can receive an input clock signal associated with the sampling frequency $$f_s = \frac{1}{T_s}$$

of the baseband signal $s(t)$, can receive a clock signal associated with an intermediate frequency $f_i$, and can receive a clock signal associated with the carrier frequency $f_c$ of the output signal.

A quantizer circuitry can receive the samples of $s_n$ of the baseband signal $s(t_n)=s_{I,n}+js_{Q,n}$, having sampling instants $t_n$, can compute the amplitude $$A_n = |s_n| = \sqrt{s_{I,n}^2 + js_{Q,n}^2}$$

and the phase $$\alpha_n = \tan^{-1}\left(\frac{s_{Q,n}}{s_{I,n}}\right)$$

of each sample using a quantization encoding table with $N_b$ bits, a table with a finite set of quantization values and a table with discrete amplitudes of quantization components $a_i=\{a_1, a_2, \ldots, a_{N_b}\}$, with $N_b=N_b$ or $N_b=N_b+1$, in which the quantized value can be decomposed. The quantizer circuitry can generate the quantized amplitude $A_{qn}=A_n+e_q$ of each sample, where $e_q$ denotes the quantization error and can generate a set of quantization bits and, based on the quantization error $e_q$, can compute a compensation factor $\Delta$ belonging to a finite discrete alphabet.

A mapper circuitry can receive the amplitude $A_q$, phase $a_n$ and compensation factor $\Delta$ for each sample, and together with the quantization table, can generate a coded mapping table with mapping codes and corresponding mapping coefficients. A secure mapper circuitry can receive the coded mapping table and the quantization table and can select the security scheme to be applied to the mapping codes and the mapping coefficients needed to generate a secure mapping table to be used in generation of bandpass components. The secure mapper circuitry can generate numerical sequences having the positions of samples in which secure mapping tables should be applied. It should be noted that the secure mapper circuitry can be configured to have numerical sequences stored in a memory element such as a look up table (LUT), read only memory (ROM), random access memory (RAM), flash memory, programmable ROM (PROM), erasable PROM (EPROM), electrically erasable PROM (EEPROM), cache memory, register memory, or the like. The secure mapper circuitry can generate the pairs of in-phase and quadrature-phase mapping components and can provide the active pair of mapping components to the corresponding bandpass modulator.

The secure mapper can apply the secure mapping table with mapping coefficients $C'_k$ where $k=1, \ldots, N_b$, with $N_b=N_b$ or $N_b=N_b+1$, to create secure mapping tables with new mapping coefficients $C'_k$ needed to achieve security on mapping the quantized value into a maximum number $N' \leq N_b$ of active pairs of in-phase sin and quadrature-phase son components related to $N' \leq N_b$ active mapping components given by $C'_k \cos(a_n)$ and $C'_k \sin(a_n)$.

According to another aspect, the maximum number of possible bandpass components and mapping coefficients $C'_k$ is $N_b$, and coefficients $C'_k$ have values from $N_b$ discrete alphabets.

According to another aspect, the maximum number of possible bandpass components or mapping coefficients $C'_k$ is $N_b+1$ for $N_b$ quantization bits and coefficients $C_k$ and $C'_k$ can represent values from $N_b+1$ discrete alphabets. Secure mapping coefficients can be applied by bandpass modulators to generate the bandpass components required by the secure mapper circuit. The set of active bandpass components can be generated at carrier frequency $f_c$.

According to another aspect, a set of memory elements (e.g., LUTs) can include the mapping table, the secure mapping table, the security scheme, the quantization encoding table, the sets of discrete amplitudes $a_i$, the set of quantization values, the like, or any combination thereof.

According to another aspect, a security scheme can be based on permutations of mapping codes and corresponding mapping coefficients.

According to another aspect, a security scheme can be based on phase rotations of mapping coefficients associated with mapping codes that can affect all or a subset of the mapping codes.

According to another aspect, a security scheme can be based on multiplying a scale factor and mapping coefficients associated with mapping codes that can affect all or a sub-set of the mapping codes.

According to another aspect, a security scheme can be based on puncturing mapping codes.

According to another aspect, a security scheme can be based on any combination of permutations, puncturing, phase rotations and scale factor multiplication.

According to another aspect, any of the security schemes disclosed herein can be combined or applied at the same time or applied at separate times to different samples or subsets of samples.

According to another aspect, any of the security schemes disclosed herein can be combined with interleaving techniques affecting the sequence of samples of the input signal.

According to another aspect, the secure mapping rule applied to each quantized value can be applied by a secure mapper circuitry to generate control information to enable bandpass modulators associated with the mapping components.

According to another aspect, the bandpass modulator circuitry can be configured as an in-phase/quadrature-phase (I/Q) digital-to-analog converter (I/Q DAC) or configured as an I/Q modulator.

According to another aspect, the secure mapper circuitry can provide information to control the phase of bandpass components generated by a set of bandpass modulators (I/Q modulators or I/Q DACs).

According to another aspect, the set of bandpass modulators can generate active bandpass components at the intermediate frequency $f_i$ and a set of mixer circuitry can upconvert the active bandpass components to the carrier frequency $f_c$.

According to another aspect, the method and apparatus for performing physical security with codified amplification includes a digital circuitry operable to compute $A_n$ and $a_n$, quantize $A_n$, perform the mapping encoding, define the secure mapping rule, perform the secure mapping of the quantized value into bandpass components and generate random permutation patterns, phase rotations or puncturing patterns.

According to another aspect, the method and apparatus for performing physical security with codified amplification can be implemented with analog or digital controls, including hardware, firmware or software.

According to another aspect, the method and apparatus for performing physical security with codified amplification can be implemented with analog components or with a combination of analog components and digital components.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

Figure 1:
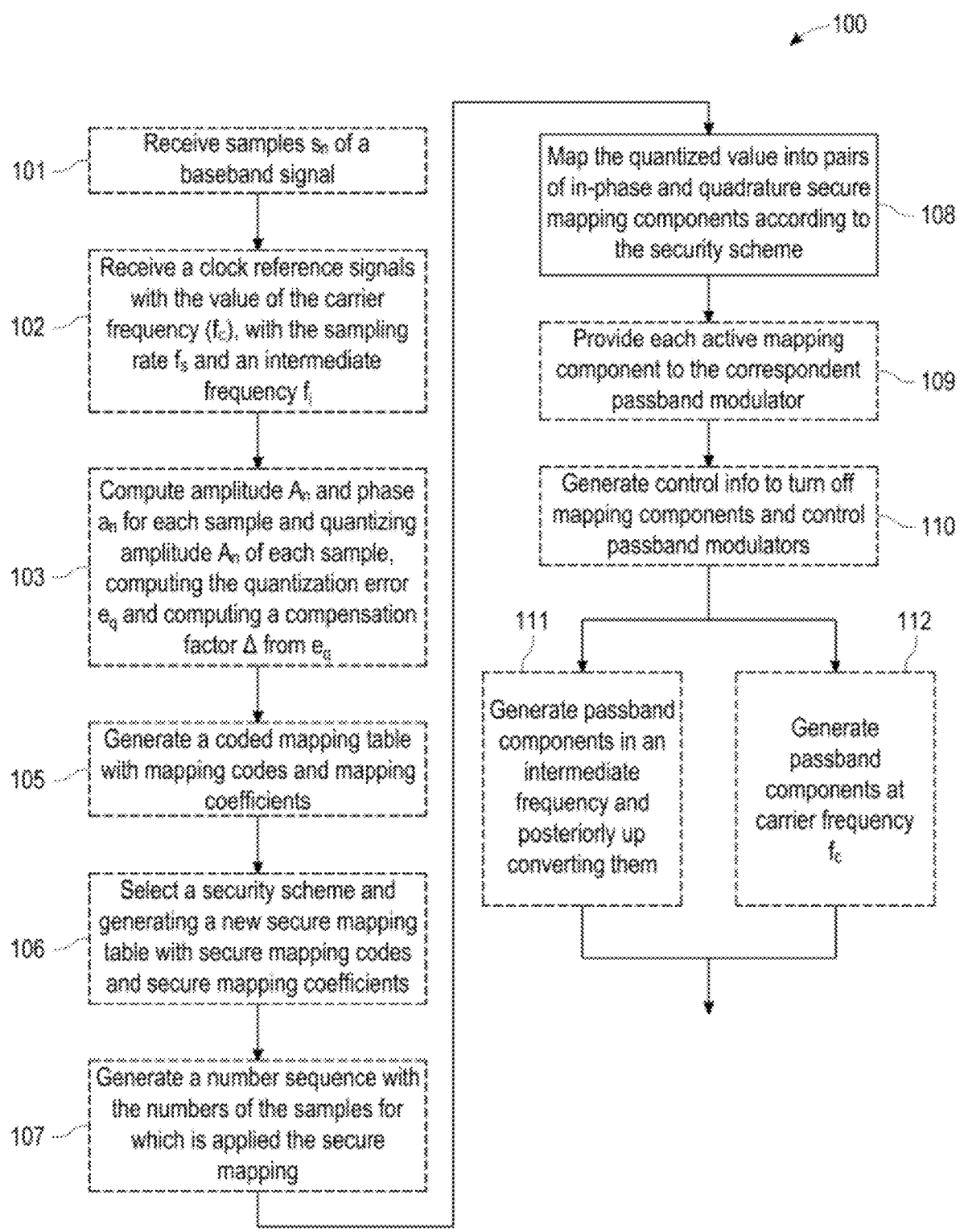
FIG. 1 illustrates one embodiment of a method of providing physical layer security in accordance with various aspects as described herein.

For simplicity and illustrative purposes, the present disclosure is described by referring mainly to exemplary embodiments thereof. In the following description, numerous specific details are set forth in order to provide a thorough understanding of the present disclosure. However, it will be readily apparent to one of ordinary skill in the art that the present disclosure may be practiced without limitation to these specific details.

Common security techniques rely on encryption schemes from higher layers, such as key cryptography protocols. Besides the possible vulnerability associated with the increased computational capacity of eavesdroppers, these techniques achieve security at the expense of spectral and energy inefficiencies of the transmission system. Another problem with these security techniques is the high data throughput, resulting in undesirable cryptographic or security coding with high overheads that may compromise overall efficiency and increase latency of the system.

In the present disclosure, both low complexity and energy efficient Physical Layer Security (PLS) can be achieved, exploring the properties of coded mapping associated with signal's envelope decomposition in codified amplification. For instance, the coding rule applied to the mapping process of quantized value of signal envelope samples into bandpass components can be securely changed. Mapping codes can be varied and can be associated with mapping coefficients that when combined can generate each bandpass mapping component. Hence, mapping code changes such as permutations or puncturing of mapping codes can enable physical layer security. Further, mapping coefficients can be modified such as manipulation of the phase or amplitude of the mapping coefficients, which can further increase the degrees of freedom of possible physical layer security implementations.

In the present disclosure, the quantized digital amplification in the decomposition of quantized sample values into constant envelope components can apply a coded mapping rule having different mapping codes that are associated with subsets of mapping coefficients. Hence, changes to the mapping codes and the corresponding mapping coefficients can be utilized to enable physical layer security, without additional complexity. This type of physical layer security remains undetectable as the transmission spectral mask still conforms to any standards requirements and the statistical characteristics of the signal envelope also remains Gaussian. Any transmission overhead is also avoided as well as any dependency on transmission channel statistics. Moreover, this quantized digital amplification can be applied along with a fully quantized digital amplification stage having a set of parallel amplifiers for improved efficiency or can be used with common power amplifiers employed in modern radio frequency front ends.

In one exemplary embodiment, a digital signal processing implementation can generate quantized punctured bandpass components that optimize energy efficiency on power amplification and power combination. A first mapper component (e.g., software, firmware, hardware) can decompose a quantized input signal sample into a sum of bandpass components according to mapping codes and can provide a reference for a second mapper component (e.g., software, firmware, hardware) to perform a secure mapping process based on a new secure mapping rule. A secure mapping rule can include generating permutations of the mapping codes, applying a phase rotation or a scale factor to the mapping coefficients, puncturing the mapping codes, the like, or any combination thereof. Further, a secure mapping rule can combine the several techniques and may change over the time or between subsets of the samples of a data block. The application of a secure mapping rule may not increase the complexity of a hardware-based transceiver as digital signal processing can be applied to perform the quantized digital amplification. Also, the quantized digital amplification can be applied along with a multi-amplifier power amplification stage followed by a combiner circuitry, optimized for the signal decomposition associated with the quantized digital amplification for improved energy efficiency.

FIG. 1 illustrates one embodiment of a method 100 of providing physical layer security in accordance with various aspects as described herein. In FIG. 1, the method 100 can start, for instance, at block 101 where it can include receiving the samples $s_n$ of a baseband signal s(t). In one example, the samples $s_n = s(t_n) = s_{I,n} + j s_{Q,n}$ of a baseband signal s(t) are quantized and decomposed into several analog bandpass components using a secure mapping rule. In another example, the input signal is a baseband signal which is sampled to generate the samples to be converted posteriorly into bandpass components. In yet another example, the samples $s_{I,n}$ and $s_{Q,n}$ of the respective in-phase and quadrature-phase components of a baseband signal are received. In yet another example, a baseband signal is received and sampled by a sampling circuitry or by a sample and hold (S/H) circuitry to generate the samples of the input signal. In yet another embodiment, the in-phase and quadrature-phase components of a baseband signal are received. At block 102, the method 100 can include receiving a clock reference with a sampling rate $f_s$, receiving a clock reference with a carrier frequency $f_c$, and receiving a clock reference with an intermediate frequency $f_i$. At block 103, the method 100 can include computing the amplitude $A_n$ and the phase $a_n$ for each sample, quantizing $A_n$ as $A_q$ using $N_b$ quantization bits from a quantization table, computing the quantization error $e_q$, and computing a compensation factor $\Delta$ from $e_q$. At block 104, the method 100 can include providing to a mapper circuitry the values of $A_q$, $a_n$, $\Delta$, and the quantization encoded table. At block 105, the method 100 can include generating a coded mapping table with mapping codes and corresponding mapping coefficients. At block 106, the method 100 can include receiving the coded mapping table and the coded quantization table and selecting the security scheme to be applied to the mapping codes and the mapping coefficients of a secure mapping table to be applied in generation of the bandpass components. At block 107, the method 100 can include generating a secure mapping table and numerical sequences having the positions of samples in which the secure mapping table will be applied in generation of the bandpass components. At block 108, the method 100 can include generating the pairs of in-phase and quadrature-phase mapping components. At block 109, the method 100 can include providing each active pair of mapping components to the corresponding bandpass modulator circuitry. At block 110, the method 100 can include generating control information to enable or disable the bandpass modulator circuitry. At block 111, the method 100 can include upconverting the bandpass components to an intermediate frequency $f_i$. At block 112, the method 100 can include upconverting the bandpass components or the intermediate frequency components $f_i$ to a carrier frequency $f_c$.

In another embodiment, the method steps described by blocks 103 to 109 can be performed in a single method step.

In another embodiment, the coded mapping table can be stored in a memory element (e.g., LUT) and as such, the method step described by block 105 is not required.

In another embodiment, as understood by a skilled artisan, based on the subject matter of the current disclosure, the method steps described by blocks 101 to 109 can be performed by memory elements (e.g., LUTs) having the quantization values, the quantization bits table, the coded mapping table, the secure mapping table, the numerical sequences having the positions of samples in which the secure mapping table can be applied to generate secure pairs of mapping components and control information.

In another embodiment, the security scheme can be changed between successive samples or between successive blocks of samples.

Figure 2A:
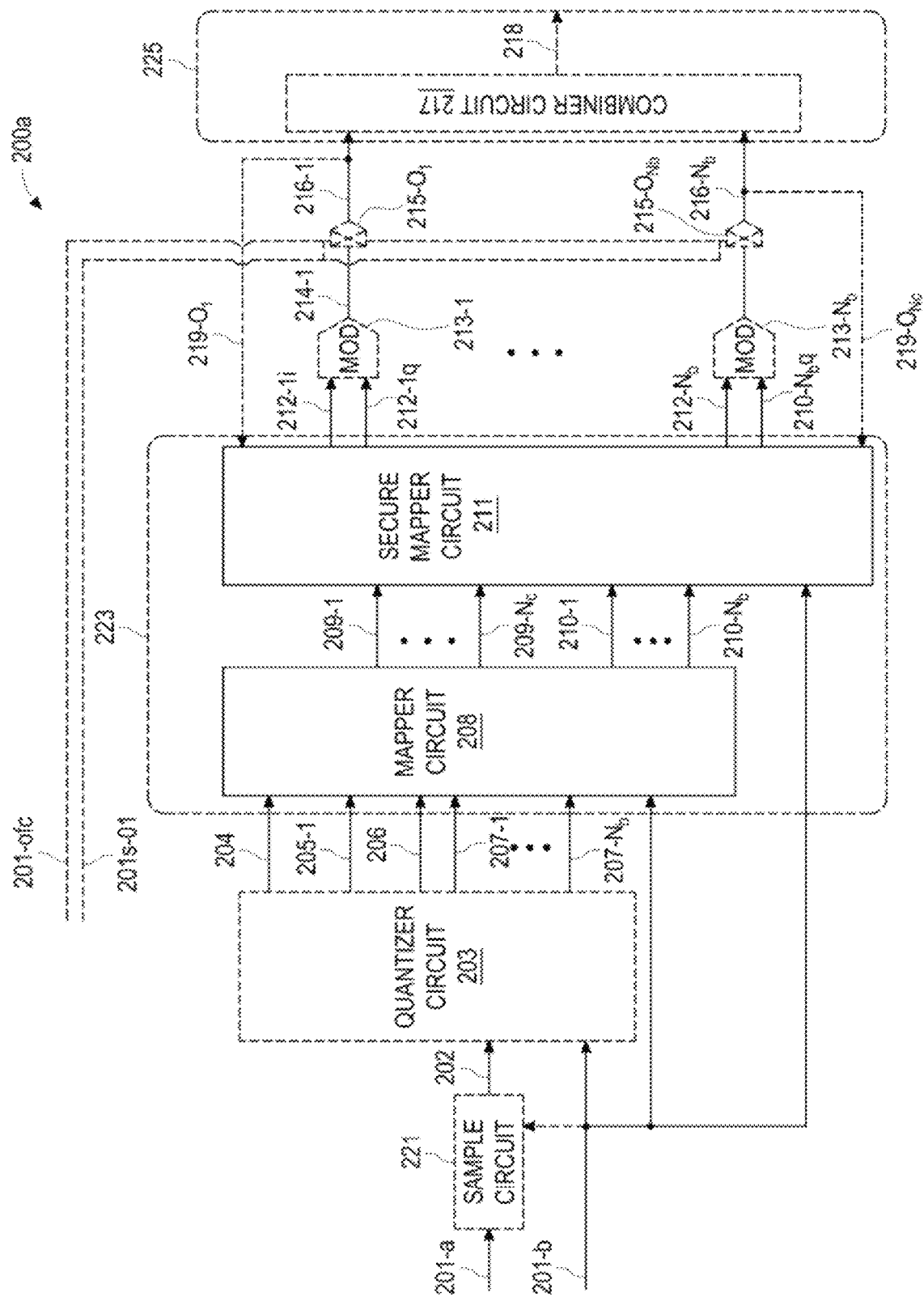
FIG. 2A illustrates one embodiment of a system of physical layer security in accordance with various aspects as described herein.

FIG. 2A illustrates one embodiment of a system 200a of physical layer security with codified amplification in accordance with various aspects as described herein. In FIG. 2A, the system 200a implements the method 100 of FIG. 1 with $N_b = 3$ or $N_b = 4$ quantization bits and the same number of mapping components. The number of mapping codes is $2^{N_b}$, which is associated with $N_b$ sets of mapping coefficients, each mapping coefficient with $2^{N_b}$ possible values. The system 200a can receive an input signal 201-a having the time samples $s_n = s(t_n)$ of a baseband signal s(t). The system 200a can also receive a clock reference signal 201-b having the sampling frequency $f_s$. Additionally or alternatively, the system 200a can receive the clock reference signal 201s-o1 having an intermediate frequency $f_i$ to be applied to mixer circuitry and a reference signal clock 201-ofc having a carrier frequency $f_c$. A skilled artisan will readily recognize that the choice of the clock reference signal can be made according to the bandwidth of the input signal, the desired frequency for the output signal, and a frequency shift of upconverting bandpass components.

In another embodiment, the input signal 201-*a* can include the samples $s_{I,n}$ and $s_{Q,n}$ of the respective in-phase and quadrature-phase components of a baseband signal.

In another embodiment, the input signal 201-*a* can be a baseband signal s(t), which can be sampled by sampling circuitry 221, to generate the time samples $s_n = s(t_n)$.

The scope of this disclosure can include the application of other clock references or other input signals, and the implementation of such variations will be readily apparent to a skilled artisan. The clock signal 201-*b* can be a clock reference signal having the sampling frequency $f_s$ and can be input to the sampling circuitry 221, the quantizer circuitry 203, the mapper circuitry 208, the secure mapper circuitry 211, the set of bandpass modulator circuitry 213-{1, ..., $N_b$+1}, the combiner circuitry 217, or the like.

The quantizer circuitry 203, for each sample $s_n$, can determine the amplitude $$A_n = |s_n| = \sqrt{s_{I,n}^2 + js_{Q,n}^2}$$

and the phase $$\alpha_n = \tan^{-1}\left(\frac{s_{Q,n}}{s_{I,n}}\right).$$

The quantizer circuitry 203 can apply a quantization encoding table having $N_b$ quantization bits, can apply a table having the quantization values, and a table having the set of discrete amplitudes of quantization components $a_i = \{a_1, a_2, \ldots, a_{N_b}\}$ in which any quantized value can be decomposed. For each sample $s_n$, the quantizer circuitry 203 can quantize the amplitude $A_n$, can generate the quantized amplitude $A_{qn} = A_n + e_q$ and the set of quantization amplitude bits 207-{1, ..., $N_b$}, and can determine a quantization error compensation factor $\Delta$ belonging to a finite discrete alphabet based on the quantization error $e_q$. Further, the quantizer circuitry 203 can generate and send the quantization amplitude table 204 to the mapper circuitry 208. In addition, the quantizer circuitry 203 can send, to the mapper circuitry 208, the quantized amplitude bits 207-{1, ..., $N_b$}, the quantized amplitude $A_q$ 205-1, the phase an 205-2 and the amplitude quantization error A 205-3, and the discrete amplitudes of quantization components at 206.

In FIG. 2A, the mapper circuitry 208 can determine a coded mapping table having mapping codes and corresponding mapping coefficients. The mapper circuitry 208 can apply the quantization table to define the set of mapping codes $M_i = \{M_0; \ldots; M_{N_c}\}$, with $N_c = 2^{N_b} - 1$, which can be associated with the sets of mapping coefficients $C_{N_b}^{(0)} \ldots C_1^{(0)}, \ldots, C_{N_b}^{(N_c)} \ldots C_1^{(N_c)}$ and can be defined in terms of the mapping coefficients $$C_k = \{C_k^{(1)}; \ldots; C_k^{(N_c)}\},$$

with k=1, ..., $N_b$. For example, with $N_b$=3 quantization bits, the mapper circuitry 208 can define an encoded mapping as shown in Table I below, with eight (8) mapping codes $M_i = \{M_0; \ldots; M_7\}$ directly related to the sets of mapping coefficients $C_3^{(0)}C_2^{(0)}C_1^{(0)}, C_3^{(1)}C_2^{(1)}C_1^{(1)}, \ldots, C_3^{(7)}C_2^{(7)}C_1^{(7)}$.

TABLE I

Mapping Coefficients and Mapping Codes for $N_b = 3$

| $C_3$ | $C_2$ | $C_0$ | Mapping Code $M_i$ |
|---|---|---|---|
| $C_3^{(0)}$ | $C_2^{(0)}$ | $C_1^{(0)}$ | $M_0$ |
| $C_3^{(1)}$ | $C_2^{(1)}$ | $C_1^{(1)}$ | $M_1$ |
| $C_3^{(2)}$ | $C_2^{(2)}$ | $C_1^{(2)}$ | $M_2$ |
| $C_3^{(3)}$ | $C_2^{(3)}$ | $C_1^{(3)}$ | $M_3$ |
| $C_3^{(4)}$ | $C_2^{(4)}$ | $C_1^{(4)}$ | $M_4$ |
| $C_3^{(5)}$ | $C_2^{(5)}$ | $C_1^{(5)}$ | $M_5$ |
| $C_3^{(6)}$ | $C_2^{(6)}$ | $C_1^{(6)}$ | $M_6$ |
| $C_3^{(7)}$ | $C_2^{(7)}$ | $C_1^{(7)}$ | $M_7$ |

$C_1$ mapping coefficients can represent values from a set of amplitudes $C_1^{(i)}, i=0, \ldots, 7$ that belongs to a discrete alphabet $A_1$ with a null value and other values defined as a function of the discrete amplitudes of the first quantization component $a_1$ or the amplitude quantization error $\Delta$. $C_2$ mapping coefficients can represent values from a set of amplitudes $C_2^{(i)}, i=0, \ldots, 7$ that belongs to a discrete alphabet $A_2$ with a null value and other values defined as a function of the discrete amplitudes of the first quantization component $a_1$, the discrete amplitudes of the second quantization component $a_2$ or the amplitude quantization error $\Delta$. $C_3$ mapping coefficients can represent values from a set of amplitudes $$C_3^{(i)}, i = 0, \ldots, 7$$

that belongs to a discrete alphabet $A_3$ with a null value and other values defined as a function of the discrete amplitudes of the first quantization component $a_1$, the discrete amplitudes of the third quantization component $a_3$, or the amplitude quantization error $\Delta$.

In another exemplary embodiment with $N_b$=4 quantization bits and $N_b = N_b$ possible bandpass components the mapper circuitry 208 can apply the quantization bits and the quantization table 206 to define an encoded mapping table with mapping codes $M_i = \{M_0; \ldots; M_{15}\}$ directly related to the sets of mapping coefficients $C_4^{(0)}C_3^{(0)}C_2^{(0)}C_1^{(0)}, C_4^{(1)}C_3^{(1)}C_2^{(1)}C_1^{(1)}, \ldots, C_4^{(15)}C_3^{(15)}C_2^{(15)}C_1^{(15)}$. $C_1$ mapping coefficients can represent values from a set of amplitudes $C_1^{(i)}, i=0, \ldots, 15$ that belong to a discrete alphabet $A_1$ with a null value and other values defined as a function of the discrete amplitudes of the first quantization component $a_1$, or the amplitude quantization error compensation factor $\Delta$. $C_2$ mapping coefficients can represent values from a set of amplitudes $$C_2^{(i)}, i = 0, \ldots, 15$$

that belong to a discrete alphabet $A_2$ with a null value and other values defined as a function of the discrete amplitudes of the first quantization component $a_1$, the discrete amplitudes of the second quantization component $a_2$, or the amplitude quantization error compensation factor $\Delta$. $C_3$ mapping coefficients can represent values from a set of amplitudes $$C_3^{(i)}, i = 0, \ldots, 15$$

that belong to a discrete alphabet $A_3$ with a null value and other values defined as a function of the discrete amplitudes of the first quantization component $a_1$, the discrete amplitudes of the second quantization component $a_2$, the discrete amplitudes of the third quantization component $a_3$, or the amplitude quantization error compensation factor $\Delta$. $C_4$ mapping coefficients can represent values from a set of amplitudes $$C_4^{(i)}, i = 0, \ldots, 15$$

that belong to a discrete alphabet $A_4$ with a null value and other values defined as a function of the discrete amplitudes of the first quantization component $a_1$, the discrete amplitudes of the second quantization component $a_2$, the discrete amplitudes of the fourth quantization component $a_4$, or the amplitude quantization error compensation factor $\Delta$.

From the mapper circuitry 208, the secure mapper circuitry 211 can receive the mapping codes 209-$\{1, \ldots, N_c\}$ and the mapping coefficients 210-$\{1, \ldots, N_b\}$ and can select the security scheme to apply in determining the updated secure mapping codes and the corresponding mapping coefficients. The secure mapper circuitry 211 can apply the security scheme to determine the secure mapping coefficients $C'_k$ where $k=1, \ldots, N_b$, and can generate secure mapping tables with new mapping coefficients $C'_k$ required to achieve security in mapping the quantized amplitude value into a maximum number $N' \leq N_b$ of in-phase $s_{l,n}$ and quadrature-phase $s_{Q,n}$ mapping components among the $N_b$ possible values 212-$\{1_i, \ldots, N_{b'i}\}$, 212-$\{1_q, \ldots, N_{b'q}\}$, related to $N' \leq N_b$ active mapping components given by $C'_k$ cos $(a_n)$ and $C'_k$ sin $(a_n)$, respectively.

In another embodiment, a security scheme can include permutations between mapping codes, phase rotations of mapping coefficients, puncturing of mapping codes and coefficients, scale factor multiplication of mapping coefficients, the like, or any combination thereof. A secure mapper circuitry can generate a secure mapping table with secure mapping codes and corresponding mapping coefficients to be applied to the mapping of quantized values and can generate the number sequence with the samples in which the secure mapping rule should be applied.

In another embodiment, with permutations of mapping codes, a permutation array $P=\{P_0, P_1, \ldots, P_{N_c}\}$, being the values adopted to define a set of permuted mapping codes $M'_i=\{M_{P_0}; M_{P_1}; \ldots ; M_{P_{N_c}}\}$, in which mapping codes are associated with the corresponding sets of secure mapping coefficients $C_{N_b}^{(P_i)}, C_{N_b-1}^{(P_i)}, \ldots, C_1^{(P_i)}$, with $i=0, \ldots, N_c$.

In one exemplary embodiment, with $N_b=3$ and $N_c=8$ mapping codes, and for a permutation array of $P=\{P_0, P_1, \ldots, P_7\}$, results in a new permuted set of mapping codes $M'_i=\{M_{P_0}; M_{P_1}; \ldots ; M_{P_7}\}$, which are associated with the corresponding sets of mapping coefficients given by $C_3^{(P_0)}C_2^{(P_0)}C_1^{(P_0)}, C_3^{(P_1)}C_2^{(P_1)}C_1^{(P_1)}, \ldots, C_3^{(P_7)}C_2^{(P_7)}C_1^{(P_7)}$. For instance, a permutation array of $P=\{7, 0,6,1,4,2,5,3\}$ results in Table II below.

TABLE II

Example of Mapping Table After Permutation of Mapping Codes

| $C_3$ | $C_2$ | $C_1$ | Mapping Code $M_i$ |
|---|---|---|---|
| $C_3^{(P0)}$ | $C_2^{(P0)}$ | $C_1^{(P0)}$ | $M_0' = M_{P0} = M_7$ |
| $C_3^{(P1)}$ | $C_2^{(P1)}$ | $C_1^{(P1)}$ | $M_1' = M_{P1} = M_0$ |
| $C_3^{(P2)}$ | $C_2^{(P2)}$ | $C_1^{(P2)}$ | $M_2' = M_{P2} = M_6$ |
| $C_3^{(P3)}$ | $C_2^{(P3)}$ | $C_1^{(P3)}$ | $M_3' = M_{P3} = M_1$ |
| $C_3^{(P4)}$ | $C_2^{(P4)}$ | $C_1^{(P4)}$ | $M_4' = M_{P4} = M_4$ |
| $C_3^{(P5)}$ | $C_2^{(P5)}$ | $C_1^{(P5)}$ | $M_5' = M_{P5} = M_2$ |
| $C_3^{(P6)}$ | $C_2^{(P6)}$ | $C_1^{(P6)}$ | $M_6' = M_{P6} = M_5$ |
| $C_3^{(P7)}$ | $C_2^{(P7)}$ | $C_1^{(P7)}$ | $M_7' = M_{P7} = M_3$ |

With eight (8) mapping codes, the number of possible permutations is forty thousand, three hundred and twenty (40,320) and permutations can change dynamically over each data block or within a data block according to a predefined pattern.

In another exemplary embodiment, with $N_b=4$ and $N_c=16$ mapping codes, for a permutation array $P=\{P_0, P_1, \ldots, P_{15}\}$, results in a new permuted set of mapping codes $M'_i=\{M_{P_0}; M_{P_1}; \ldots ; M_{P_{15}}\}$, which are associated with the corresponding sets of mapping coefficients given by $C_4^{(0)}C_3^{(0)}C_2^{(0)}C_1^{(0)}, C_4^{(1)}C_3^{(1)}C_2^{(1)}C_1^{(1)}, \ldots, C_4^{(15)}C_3^{(15)}C_2^{(15)}C_1^{(15)}$.

In another embodiment, the secure mapper circuitry can apply a puncturing array $Pu=\{pu_1, \ldots, pu_{N_c}\}$, where each $pu_i$ represents a value of one (1) without puncturing or a value of X with puncturing, with the puncturing pattern to be applied to puncture mapping codes $M_i=\{M_0; M_1; \ldots ; M_{N_c}\}$. For instance, with $N_b=3$ and a puncturing rule of $Pu=\{1, X, 1, 1, X, 1, 1\}$, results in the set of punctured mapping codes $M'_i=\{M_0; M_1; \ldots ; M_7\}$, directly related to the sets of mapping coefficients $C_3^{(0)}C_2^{(0)}C_1^{(0)}$, X, $C_3^{(2)}C_2^{(2)}C_1^{(2)}$, X, $C_3^{(3)}C_2^{(3)}C_1^{(3)}$, X, $C_3^{(5)}C_2^{(5)}C_1^{(5)}$, $C_3^{(6)}C_2^{(6)}C_1^{(6)}$, $C_3^{(7)}C_2^{(7)}C_1^{(7)}$.

In another exemplary embodiment, with $N_b=4$ quantization bits and $N_b=N_b$ possible bandpass components for a puncturing rule $Pu=\{1, X, 1, 1, X, 1, 1, 1, 1, 1, X, 1, 1, 1, X, 1\}$, results in the set of mapping codes $M'_i=\{M_0; X; M_2; M_3; X; M_5; \ldots ; M_9; X; M_{11}; M_{12}; M_{13}; X; M_{15}\}$, directly related to the sets of mapping coefficients: $C_4^{(0)}C_3^{(0)}C_2^{(0)}C_1^{(0)}$, X, $C_4^{(2)}C_3^{(2)}C_2^{(2)}C_1^{(2)}$, $C_4^{(3)}C_3^{(3)}C_2^{(3)}C_1^{(3)}$, X, $C_4^{(5)}C_3^{(5)}C_2^{(5)}C_1^{(5)}$, $\ldots$, $C_4^{(9)}C_3^{(9)}C_2^{(9)}C_1^{(9)}$, X, $C_4^{(11)}C_3^{(11)}C_2^{(11)}C_1^{(11)}$, $\ldots$, $C_4^{(13)}C_3^{(13)}C_2^{(13)}C_1^{(13)}$, X, $C_4^{(15)}C_3^{(15)}C_2^{(15)}C_1^{(15)}$.

In another embodiment, the puncturing rule can be constant over the entire data block or may differ for different subsets of samples within the data block.

In another embodiment, mapping codes can be punctured according to a predetermined rule.

In another embodiment, the puncturing rule can be applied as a random phase rotation $$C_k^{(i)} = e^{j\alpha} C_k^{(i)}$$

to a sub-set of mapping codes and corresponding mapping coefficients, with a denoting the phase rotation value. A phase rotation can affect all mapping codes or a subset of mapping codes. A phase rotation value can be predetermined, or the phase rotation may change over the data block or samples of the envelope according to a predetermined rule. This corresponds to a phase rotation of the values of the alphabets $A_k$ associated with the sets of possible values of mapping coefficients.

In another embodiment, a phase rotation can be applied to only a set of mapping coefficients $$C_k^{(i)} = e^{j\alpha} C_k^{(i)},$$

for i=$i_1$, ..., $i_n$ and k=1, ..., N', with N'<$N_b$, with only some alphabets of possible values of mapping coefficients being affected by phase rotation.

In another embodiment, a scale factor can be applied to a limited set of mapping coefficients $$C_{ks}^{(i)} = s_f C_{ks}^{(i)},$$

for i=$i_1$, ..., $i_n$ and $k_s$=$ks_1$, $ks_2$, ..., N', with N'<$N_b$.

In another embodiment, for a security scheme based on permutations of mapping codes, any combination of puncturing, phase rotations and multiplication of mapping coefficients by a scale factor can be applied to different subsets of samples.

In FIG. 2A, the secure mapper 211 can generate a set of N'≤$N_b$ active pairs of in-phase and quadrature-phase components related to N'≤$N_b$ mapping components, based on a secure mapping table such as stored in a memory element (e.g., LUT) that contains the mapping coefficient values of the secure mapping rule.

In another embodiment, the secure mapping table can also include the quantization bits, the sets of discrete amplitudes $a_i$ and the set of quantized values.

In another embodiment, the mapping table, the secure mapping table, the quantization encoding table, the quantization values table and quantization amplitude components can be previously stored in memory elements (e.g., LUTs) that are available to the quantizer circuitry, the mapper, or the secure mapper circuit.

In another embodiment, memory elements (e.g., LUTs) can include the permutation rules, the puncturing rules, the phase rotations rules to be applied in the definition of the secure mapping tables that are also previously stored in those memory elements.

In another embodiment, the secure mapper circuitry 211 can generate numerical sequences having the positions of samples in which secure mapping tables are applied, or numerical sequences are previously stored in memory elements (e.g., LUTs).

In another embodiment, sets of numerical sequences with the positions of samples affected by security schemes can be previously stored in LUTs.

In FIG. 2A, the secure mapper 211 can output N'≤$N_b$ active pairs of in-phase and quadrature-phase mapping components 212-{$1_i$, ..., $N_{bi}$}, 212-{$1_q$, ..., $N_{bq}$}, to a set of N' bandpass modulator circuitry 213-{1, ..., $N_b$}. The set of N' bandpass modulator circuitry 213-{1, ..., $N_b$} can be configured as I/Q DAC circuitry or I/Q modulator circuitry, can generate N' active bandpass components 214-{$1_i$, ..., N'}. The set of N' bandpass modulator circuitry 213-{1, ..., $N_b$} can generate the set of bandpass components 214-{$1_i$, ..., N'} having the carrier frequency $f_c$. The secure mapper circuitry 211 can also generate control information to activate or deactivate the mixer circuitry 215-{$O_1$, ..., $O_{N_b}$}.

In another embodiment, the secure mapper circuitry 211 can provide control information to the set of active bandpass modulator circuitry 213-{1, ..., $N_b$} to control the initial phase of the generated bandpass components 214-{$1_i$, ..., N'}.

In another embodiment, the set of bandpass modulator circuitry 213-{1, ..., $N_b$} can generate a set of N' active bandpass components 214-{$1_i$, ..., N'} having the intermediate frequency $f_i$ and the mixer circuitry 215-{$O_1$, ..., $O_{N_b}$} can upconvert the bandpass components 214-{$1_i$, ..., N'} to the carrier frequency $f_c$ to obtain the carrier frequency components 216-{1, ..., $N_b$}.

In FIG. 2A, the set of mixer circuitry 215-{$O_1$, ..., $O_{N_b}$} can receive signal 201s-o1 having a certain reference frequency.

In another embodiment, the set of mixer circuitry 215-{$O_1$, ..., $O_{N_b}$} can receive signal 201-ofc having the carrier frequency $f_c$.

In another embodiment, the certain reference signal is associated with the intermediate frequency $f_i$.

In another embodiment, the certain reference signal is associated with up conversion from the intermediate frequency $f_i$ to the carrier frequency $f_c$.

In another embodiment, the bandpass modulator circuitry 213-{1, ..., $N_b$} can output feedback signals F-{$O_1$, ..., $O_{N_b}$} to the secure mapper circuitry 211 to generate time or phase control information to enable time or phase synchronization of the active bandpass components 214-{$1_i$, ..., N'}.

In another embodiment, the mixer circuitry 215-{$O_1$, ..., $O_{N_b}$} can output the feedback signals F-{$O_1$, ..., $O_{N_b}$} to the secure mapper circuitry 211 to generate time or phase control information to enable time or phase synchronization of the active bandpass components 214-{$1_i$, ..., N'}.

In another embodiment, an output circuitry 225 can include a combiner circuitry 217. The combiner circuitry 217 can combine the components 216-{1, ..., $N_b$} to obtain the output signal 218.

In another exemplary embodiment, the output circuitry 225 can include a set of amplifiers (e.g., power amplifiers) with each amplifier corresponding to a certain component signal 216-{1, ..., $N_b$}. The set of amplifiers can amplify the components 216-{1, ..., $N_b$} to obtain a set of amplified signals. The combiner circuitry 225 can then combine the set of amplified signals to obtain the output signal 218.

In another embodiment, the sampling circuitry 221, the mapper circuitry 208, the secure mapper circuitry 211, and the quantizer circuitry 203 can be configured in a single circuitry having hardware, software or firmware, including digital or analog circuitry with or without a microprocessor, a field programmable gate array (FPGA), or a digital signal processor (DSP).

In another embodiment, the mapper circuitry 208 and the secure mapper circuitry 211 can be configured in a single circuitry 223 having hardware, software or firmware, including digital or analog circuitry with or without a microprocessor, an FPGA, a DSP, or the like.

Figure 2B:
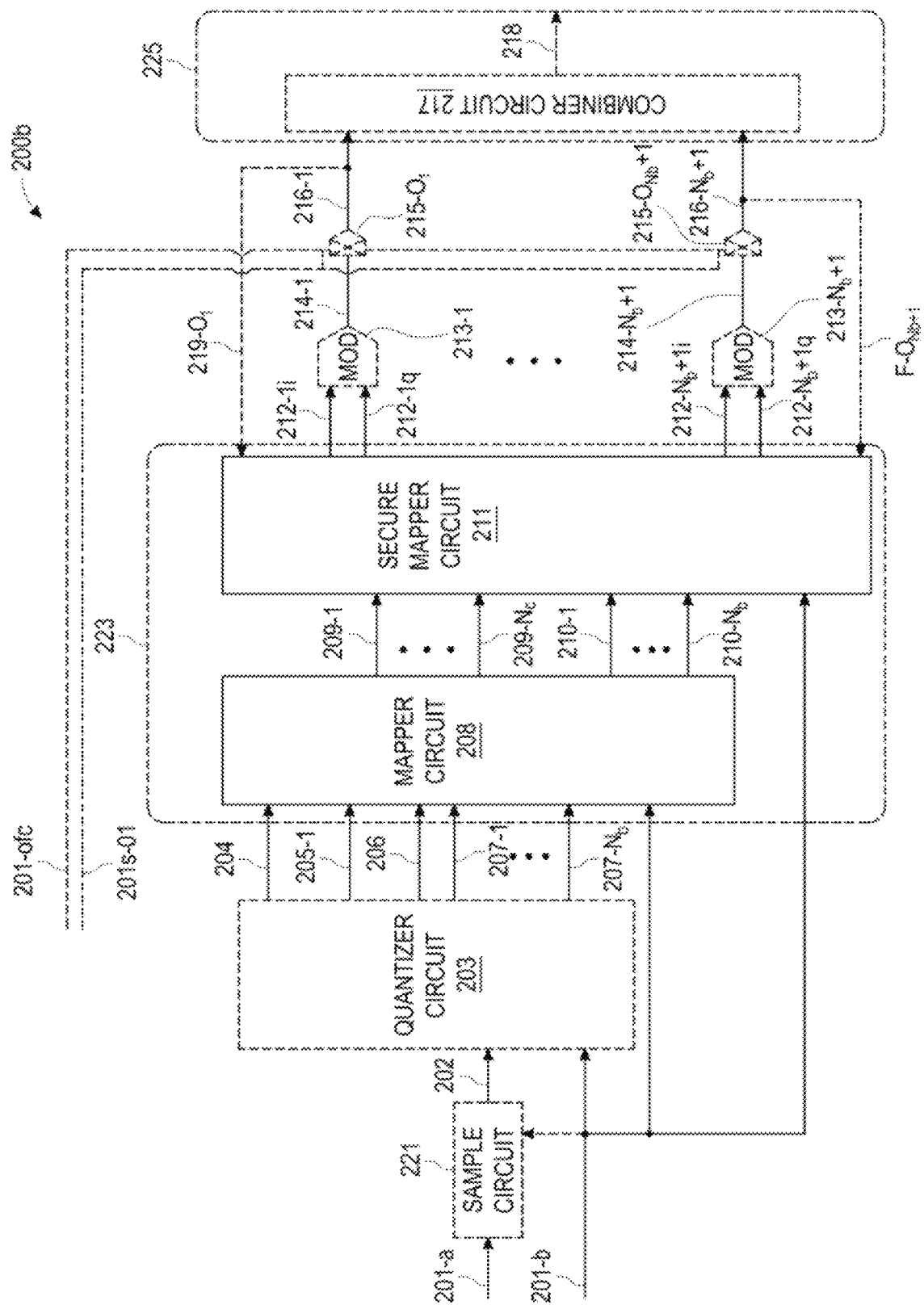
FIG. 2B illustrates another embodiment of a system of physical layer security in accordance with various aspects as described herein.

FIG. 2B illustrates one embodiment of a system 200b of physical layer security in accordance with various aspects as described herein. In FIG. 2B, the system 200b implements the method 100 of FIG. 1 with $N_b$ quantization bits and $N_b$=$N_b$+1 possible bandpass components 214-{$1_i$, ..., $N_b$+1}. The clock signal 201-b can be a clock reference signal having the sampling frequency $f_s$ and can be input to the sampling circuitry 221, the quantizer circuitry 203, the mapper circuitry 208, the secure mapper circuitry 211, the set of bandpass modulator circuitry 213-{1, ..., $N_b$+1}, the combiner circuitry 217, the like, or any combination thereof.

In FIG. 2B, the mapper circuitry 208 generates a set of N'≤$N_{b'}$ active pairs of in-phase and quadrature-phase components related to N'≤$N_{b'}$ mapping components according to a mapping table, stored in a memory element (e.g., LUT) configured to include the mapping codes and mapping coefficients associated with the bandpass components, and may also include the quantization bit combinations, the sets of discrete amplitudes at, and the set of quantized values. In this exemplary embodiment, the system 200*b* is configured for $N_b=4$ quantization bits and $N_b'=N_b+1$ possible bandpass components. Other embodiments can be implemented employing an alternative number of quantization bits. The mapper circuitry 208 can include quantization bits and a quantization encoding table to define a mapping table with mapping codes. The mapper circuitry 208 can include the quantization table to define the set of mapping codes $M_i=\{M_0; M_1; \ldots; M_{N_c}\}$, with $N_c=2^{N_b}-1$, which are associated with the sets of mapping coefficients $C_{N_{b'}}^{(0)} \ldots C_1^{(0)}, \ldots, C_{N_{b'}}^{(N_c)} \ldots C_1^{(N_c)}$ and defined in terms of mapping coefficients $$C_k = \{C_k^{(1)}; \ldots; C_k^{(N_c)}\},$$

with $k=1, \ldots, N_{b'}$. For example, with $N_b=4$ quantization bits and $N_b'=5$ results in $N_c=16$ mapping codes $M_i=\{M_0; \ldots; M_{15}\}$ directly related to the sets of mapping coefficients $C_5^{(0)}C_4^{(0)}C_3^{(0)}C_2^{(0)}C_1^{(0)}, C_5^{(1)}C_4^{(1)}C_3^{(1)}C_2^{(1)}C_1^{(1)}, \ldots, C_5^{(15)}C_4^{(15)}C_3^{(15)}C_2^{(15)}C_1^{(15)}$. The coefficients $C_k$, $k=1, \ldots, N_b+1$, when security is not applied, can map the quantized magnitude value into $N' \leq N_b$ pairs of in-phase $s_{I,n}$ and quadrature-phase $s_{Q,n}$ mapping components. $C_1$ mapping coefficients can represent values from a set of amplitudes $C_1^{(i)}, i=0, \ldots, 15$, belonging to a discrete alphabet $A_1$ with a null value and other values defined as a function of the discrete amplitudes of the first quantization component $a_1$ or the amplitude quantization error compensation factor $\Delta$. $C_2$ mapping coefficients can represent values from a set of amplitudes $$C_2^{(i)}, i = 0, \ldots, 15,$$

belonging to a discrete alphabet $A_2$ with a null value and other values defined as a function of the discrete amplitudes of the first quantization component $a_1$, or the amplitude quantization error compensation factor $\Delta$. $C_3$ mapping coefficients can represent values from a set of amplitudes $$C_3^{(i)}, i = 0, \ldots, 15,$$

belonging to a discrete alphabet $A_3$ with a null value and other values defined as a function of the discrete amplitudes of the first quantization component $a_1$, the discrete amplitudes of the second quantization component $a_2$, or the amplitude quantization error compensation factor $\Delta$. $C_4$ mapping coefficients can represent values from a set of amplitudes $$C_4^{(i)}, i = 0, \ldots, 15,$$

belonging to a discrete alphabet $A_4$ with a null value and other values defined as a function of the discrete amplitudes of the first quantization component $a_1$, the discrete amplitudes of the second quantization component $a_2$, the discrete amplitudes of the third quantization component $a_3$, or the amplitude quantization error compensation factor $\Delta$. $C_5$ mapping coefficients can represent values from a set of amplitudes $$C_5^{(i)}, i = 0, \ldots, 15,$$

belonging to a discrete alphabet $A_5$ with a null value and other values defined as a function of the discrete amplitudes of the first quantization component $a_1$, the discrete amplitudes of the second quantization component $a_2$, the discrete amplitudes of the third quantization component $a_3$, the discrete amplitudes of the fourth quantization component $a_4$, or the amplitude quantization error compensation factor $\Delta$.

In another embodiment, when security is not applied, the coefficients $C_k$, $k=1, \ldots, N_b+1$ can map the quantized magnitude value into $N' \leq N^b$ pairs of in-phase $s_{I,n}$ and quadrature-phase son mapping components. $C_1$ mapping coefficients can represent values from a set of amplitude $$C_1^{(i)}, i = 0, \ldots, 15,$$

belonging to a discrete alphabet $A_1$ with a null value and other values defined as a function of the discrete amplitudes of the first quantization component $a_1$ or the amplitude quantization error compensation factor $\Delta$. $C_2$ mapping coefficients can represent values from a set of amplitudes $$C_2^{(i)}, i = 0, \ldots, 15,$$

belonging to a discrete alphabet $A_2$ with a null value and other values defined as a function of the discrete amplitudes of the first quantization component $a_1$, the discrete amplitudes of the second quantization component $a_2$, or the amplitude quantization error compensation factor $\Delta$. $C_3$ mapping coefficients can represent values from a set of amplitudes $$C_3^{(i)}, i = 0, \ldots, 15,$$

belonging to a discrete alphabet $A_3$ with a null value and other values defined as a function of the discrete amplitudes of the first quantization component $a_1$, the discrete amplitudes of the second quantization component $a_2$, the discrete amplitudes of the third quantization component $a_3$, or the amplitude quantization error compensation factor $\Delta$. $C_4$ mapping coefficients can represent values from a set of amplitudes $$C_4^{(i)}, i = 0, \ldots, 15,$$

belonging to a discrete alphabet $A_4$ with a null value and other values defined as a function of the discrete amplitudes of the first quantization component $a_1$, the discrete amplitudes of the second quantization component $a_2$, the discrete amplitudes of the third quantization component $a_3$, the discrete amplitudes of the fourth quantization component $a_4$, or the amplitude quantization error compensation factor Δ. $C_5$ mapping coefficients can represent values from a set of amplitudes $$C_5^{(i)}, i = 0, \ldots, 15,$$

belonging to a discrete alphabet $A_5$ with a null value and other values defined as a function of the discrete amplitudes of the first quantization component $a_1$, the discrete amplitudes of the second quantization component $a_2$, the discrete amplitudes of the third quantization component $a_3$, the discrete amplitudes of the fourth quantization component $a_4$, the discrete amplitudes of the fifth quantization component $a_5$, or the amplitude quantization error compensation factor Δ.

In FIG. 2B, the secure mapper circuitry 211 can receive from the mapper circuitry 208 the mapping codes 209-{1, . . . , $N_c$} and the mapping coefficients 210-{1, . . . , $N_b$+1} and can select the security scheme to apply to the new secure mapping codes and corresponding mapping coefficients. The secure mapper circuitry 211 can apply the security scheme to compute the secure mapping coefficients $C'_k$, where k=1, . . . , $N_{b'}$, where $N_{b'}=N_b+1$, and can generate the secure mapping tables with new mapping coefficients $C'_k$ needed to achieve security on mapping the quantized value into a maximum number $N' \leq N_{b'}$ among the $N_{b'}$ possible values of in-phase $s_{I,n}$ and quadrature-phase $s_{Q,n}$ mapping components 212-{$1_i$, . . . , $N_{b'i}$}, 212-{$1_q$, . . . , $N_{b'q}$}, related to $N' \leq N_b$ active mapping components given by $C'_k \cos(a_n)$ and $C'_k \sin(a_n)$.

In one embodiment, a security scheme can include permutations between mapping codes, phase rotations of mapping coefficients, puncturing of the mapping codes and the mapping coefficients, or scale factor multiplication of the mapping coefficients. The secure mapper circuitry can generate a secure mapping table having the secure mapping codes and corresponding mapping coefficients configured to map the quantized values into bandpass components and can generate numerical sequences with the positions of samples in which secure mapping tables are applied.

In another embodiment, with permutations of mapping codes, a permutation array {$P_0, P_1, \ldots, P_{N_c}$}, being the values adopted to define a set of permuted mapping codes $M'_i=\{M_{P_0}; M_{P_1}; \ldots; M_{P_{N_c}}\}$, in which mapping codes are associated with the corresponding sets of secure mapping coefficients $$C_{N_b}^{(P_i)}, C_{N_{b'}-1}^{(P_i)}, \ldots, C_1^{(P_i)}, \text{with } i = 0, \ldots, N_c.$$

For instance, with $N_b$=4 quantization bits with permutations in sixteen (16) mapping codes for a permutation array P={$P_0, P_1, \ldots, P_{15}$}, results in a new permuted set of mapping codes $M'_i=\{M_{P_0}; M_{P_1}; \ldots; M_{P_{15}}\}$, which are associated with the corresponding sets of mapping coefficients given by: $C_5^{(P_0)}C_4^{(P_0)}C_3^{(P_0)}C_2^{(P_0)}C_1^{(P_0)}$, $C_5^{(P_1)}C_4^{(P_1)}C_3^{(P_1)}C_2^{(P_1)}C_1^{(P_1)}, \ldots, C_5^{(P_{15})}C_4^{(P_{15})}C_3^{(P_{15})}C_2^{(P_{15})}C_1^{(P_{15})}$. For instance, the permutation array P={7, 0, 10, 12, 6, 1, 11, 13, 4, 2, 9, 15, 5, 3, 8, 14}, results in the secure mapping table obtained with permutations of mapping codes as shown in Table III below.

TABLE III

Example of Mapping Table After Permutation of Mapping Codes

| $C_5$ | $C_4$ | $C_3$ | $C_2$ | $C_1$ | Mapping Code $M_i'$ |
|---|---|---|---|---|---|
| $C_5^{(p0)}$ | $C_4^{(p0)}$ | $C_3^{(p0)}$ | $C_2^{(p0)}$ | $C_1^{(p0)}$ | $M_0' = M_{P0}$ |
| $C_5^{(p1)}$ | $C_4^{(p1)}$ | $C_3^{(p1)}$ | $C_2^{(p1)}$ | $C_1^{(p1)}$ | $M_1' = M_{P1}$ |
| $C_5^{(p2)}$ | $C_4^{(p2)}$ | $C_3^{(p2)}$ | $C_2^{(p2)}$ | $C_1^{(p2)}$ | $M_2' = M_{P2}$ |
| $C_5^{(p3)}$ | $C_4^{(p3)}$ | $C_3^{(p3)}$ | $C_2^{(p3)}$ | $C_1^{(p3)}$ | $M_3' = M_{P3}$ |
| $C_5^{(p4)}$ | $C_4^{(p4)}$ | $C_3^{(p4)}$ | $C_2^{(p4)}$ | $C_1^{(p4)}$ | $M_4' = M_{P4}$ |
| $C_5^{(p5)}$ | $C_4^{(p5)}$ | $C_3^{(p5)}$ | $C_2^{(p5)}$ | $C_1^{(p5)}$ | $M_5' = M_{P5}$ |
| $C_5^{(p6)}$ | $C_4^{(p6)}$ | $C_3^{(p6)}$ | $C_2^{(p6)}$ | $C_1^{(p6)}$ | $M_6' = M_{P6}$ |
| $C_5^{(p7)}$ | $C_4^{(p7)}$ | $C_3^{(p7)}$ | $C_2^{(p7)}$ | $C_1^{(p7)}$ | $M_7' = M_{P7}$ |
| $C_5^{(p8)}$ | $C_4^{(p8)}$ | $C_3^{(p8)}$ | $C_2^{(p8)}$ | $C_1^{(p8)}$ | $M_8' = M_{P7}$ |
| $C_5^{(p9)}$ | $C_4^{(p9)}$ | $C_3^{(p9)}$ | $C_2^{(p9)}$ | $C_1^{(p9)}$ | $M_9' = M_{P7}$ |
| $C_5^{(p10)}$ | $C_4^{(p10)}$ | $C_3^{(p10)}$ | $C_2^{(p10)}$ | $C_1^{(p10)}$ | $M_{10}' = M_{P7}$ |
| $C_5^{(p11)}$ | $C_4^{(p11)}$ | $C_3^{(p11)}$ | $C_2^{(p11)}$ | $C_1^{(p11)}$ | $M_{11}' = M_{P7}$ |
| $C_5^{(p12)}$ | $C_4^{(p12)}$ | $C_3^{(p12)}$ | $C_2^{(p12)}$ | $C_1^{(p12)}$ | $M_{12}' = M_{P7}$ |
| $C_5^{(p13)}$ | $C_4^{(p13)}$ | $C_3^{(p13)}$ | $C_2^{(p13)}$ | $C_1^{(p13)}$ | $M_{13}' = M_{P7}$ |
| $C_5^{(p14)}$ | $C_4^{(p14)}$ | $C_3^{(p14)}$ | $C_2^{(p14)}$ | $C_1^{(p14)}$ | $M_{14}' = M_{P7}$ |
| $C_5^{(p15)}$ | $C_4^{(p15)}$ | $C_3^{(p15)}$ | $C_2^{(p15)}$ | $C_1^{(p15)}$ | $M_{15}' = M_{P7}$ |

The secure mapping table shown in Table III is solely for illustrative purposes and not to be limiting. The number of possible permutation arrays for sixteen (16) mapping codes is 2.0923E+13, and the permutations of mapping codes can change dynamically over each data block or within a data block according to a predetermined pattern.

In another embodiment, the secure mapper circuitry can apply a puncturing pattern to puncture mapping codes. The secure mapper circuitry can apply a puncturing array Pu={$pu_1, \ldots, pu_{N_c}$}, where each $pu_i$ can represent a value of one (1) without puncturing or a value of X for puncturing, with the puncturing pattern to be applied to puncture mapping codes $M_i=\{M_0; M_1; \ldots; M_{N_c}\}$.

In another embodiment, the puncturing rule is constant over the entire data block or may differ for different subsets of samples within the data block. Mapping codes can be punctured according to a predetermined rule and can be replaced by another code or a reference dummy value, and at a receiver a de-puncturing operation can be performed to recover the signal envelope. For instance, a puncturing rule Pu={1, X, 1, 1, X, 1, 1, 1, 1, 1, X, 1, 1, 1, X, 1}, results in the punctured mapping codes $M'_i=\{M_0; X; M_2; M_3; X; M_5; \ldots; M_9; X; M_{11}; M_{12}; M_{13}; X; M_{15}\}$, directly related to the sets of mapping coefficients: $C_5^{(0)}C_4^{(0)}C_3^{(0)}C_2^{(0)}C_1^{(0)}$, X, $C_5^{(2)}C_4^{(2)}C_3^{(2)}C_2^{(2)}C_1^{(2)}$, $C_5^{(3)}C_4^{(3)}C_3^{(3)}C_2^{(3)}C_1^{(3)}$, X, $C_5^{(5)}C_4^{(5)}C_3^{(5)}C_2^{(5)}C_1^{(5)}, \ldots, C_5^{(9)}C_4^{(9)}C_3^{(9)}C_2^{(9)}C_1^{(9)}$, X, $C_5^{(11)}C_4^{(11)}C_3^{(11)}C_2^{(11)}C_1^{(11)}, \ldots, C_5^{(13)}C_4^{(13)}C_3^{(13)}C_2^{(13)}C_1^{(13)}$, X, $C_5^{(15)}C_4^{(15)}C_3^{(15)}C_2^{(15)}C_1^{(15)}$.

In another embodiment, the puncturing rule can be applied as a random phase rotation $$C_k^{(i)} = e^{j\alpha} C_k^{(i)}$$

is applied to a subset of mapping codes and corresponding mapping coefficients. The phase rotation can affect all mapping codes or subsets of mapping codes. The phase value can be predetermined and the phase rotation may change over the data block or between successive samples of the input signals' envelope according to a predetermined rule. This corresponds to a phase rotation of the values of the alphabets $A_k$ associated with the sets of possible values of mapping coefficients.

In another embodiment, the phase rotation can be applied to only a set of mapping coefficients $$C_{ks}^{(i)} = e^{j\alpha} C_{ks}^{(i)},$$

for i=$i_1, \ldots, i_n$ and ks=$ks_1, ks_2, \ldots,$ N', with N'<$N_{b'}$.

In another embodiment, a scale factor can be applied to a limited set of mapping coefficients $$C_{ks}^{(i)} = s_f C_{ks}^{(i)},$$

for i=$i_1, \ldots, i_n$ and $k_s$=$ks_1, ks_2, \ldots,$ N', with N'<$N_{b'}$.

In FIG. 2B, based on a secure mapping table, the secure mapper circuitry 211 can generate a set of N'≤$N_{b'}$ active pairs of in-phase and quadrature-phase mapping components 212-$\{1_i, \ldots, N_{b'i}\}$, 212-$\{1_q, \ldots, N_{b'q}\}$ related to N'≤$N_{b'}$ mapping components according to the secure mapping table that can be stored in a memory element (e.g., LUT) that includes the mapping component values according to the secure mapping rule. The secure mapper circuitry 211 can generate numerical sequences with the positions of samples in which the secure mapping tables are applied or numerical sequences are previously stored in the memory elements.

In another embodiment, several sets of numerical sequences having the positions of samples affected by security schemes can be stored in memory elements (e.g., LUTs).

In another embodiment, the mapping table, the secure mapping table, the quantization encoding table, the quantization values table, the quantization amplitude components, or the like can be stored in memory elements (e.g., LUTs) that are operationally coupled to the quantizer circuitry, the mapper circuitry, the secure mapper circuitry, or another circuit.

In another embodiment, the permutation rules, the puncturing rules, the phase rotation rules to be applied in accordance with the secure mapping tables can also be stored in memory elements (e.g., LUTs).

In FIG. 2B, the secure mapper circuitry 211 can output active N'≤$N_{b'}$ pairs of in-phase and quadrature-phase mapping components 212-$\{1_i, \ldots, N_{b'i}\}$, 212-$\{1_q, \ldots, N_{b'q}\}$ to a set of N' bandpass modulator circuitry 213-$\{1, \ldots, N_b+1\}$, which can be configured as I/Q DACs or I/Q modulators, operable to generate the N' active bandpass components 214-$\{1, \ldots, N_b+1\}$. Without the mixer circuitry 215-$\{O_1, \ldots, O_{N'_b}\}$, the set of N' bandpass modulator circuitry 213-$\{1, \ldots, N_b+1\}$ can generate the set of N' active bandpass components 214-$\{1, \ldots,$ N'$\}$ with the carrier frequency $f_c$.

In another embodiment, the secure mapper circuitry 211 can apply the phase $a_n$ of each sample to control the initial phase of the bandpass components 214-$\{1, \ldots, N_b+1\}$ generated by the set of bandpass modulator circuitry 213-$\{1, \ldots, N_b+1\}$.

In another embodiment, the set of bandpass modulator circuitry 213-$\{1, \ldots, N_b+1\}$ can generate the set of active bandpass components 214-$\{1, \ldots, N_b+1\}$ at intermediate frequency $f_i$ and the mixer circuitry 215-$\{O_1, \ldots, O_{N'_b}\}$ can be applied to upconvert the bandpass components 214-$\{1, \ldots, N_b+1\}$ to the carrier frequency $f_c$.

In another embodiment, the feedback signals 219-$\{O_1, \ldots, O_{N_b+1}\}$ outputted by the set of bandpass modulator circuitry 213-$\{1, \ldots, N_b+1\}$ can be input to the secure mapper circuitry 211 operable to generate phase and time control information for the bandpass modulator circuitry 213-$\{1, \ldots, N_b+1\}$ to assure time and phase synchronization of active bandpass components.

In another embodiment, the feedback signals 219-$\{O_1, \ldots, O_{N_b+1}\}$ can be output from the set of mixer circuitry 215-$\{O_1, \ldots, O_{N_b+1}\}$ and input to the secure mapper circuitry 211 to generate phase and time control information to enable time and phase synchronization of active bandpass components.

In another embodiment, the reference signal clock 201$s$-$o1$ having the intermediate frequency $f_i$, can be input to the set of bandpass modulator circuitry 213-$\{1, \ldots, N_b+1\}$ and the input signal 201-$ofc$ having the carrier frequency $f_c$ can provide a reference signal to the set of mixer circuitry 215-$\{O_1, \ldots, O_{N_b+1}\}$ to enable up-conversion of the bandpass components 214-$\{1, \ldots, N_b+1\}$ to obtain carrier frequency components 216-$\{1, \ldots, N_b+1\}$.

In another exemplary embodiment, the output circuitry 225 can include the combiner circuitry 217. The combiner circuitry 217 can combine the components 216-$\{1, \ldots, N_b+1\}$ to obtain the output signal 218.

In another exemplary embodiment, the output circuitry 225 can include a set of amplifiers (e.g., power amplifiers) with each amplifier corresponding to a certain component signal 216-$\{1, \ldots, N_b+1\}$.

The set of amplifiers can amplify the components 216-$\{1, \ldots, N_b+1\}$ to obtain a set of amplified signals. The combiner circuitry 225 can then combine the set of amplified signals to obtain the output signal 218.

Figure 3:
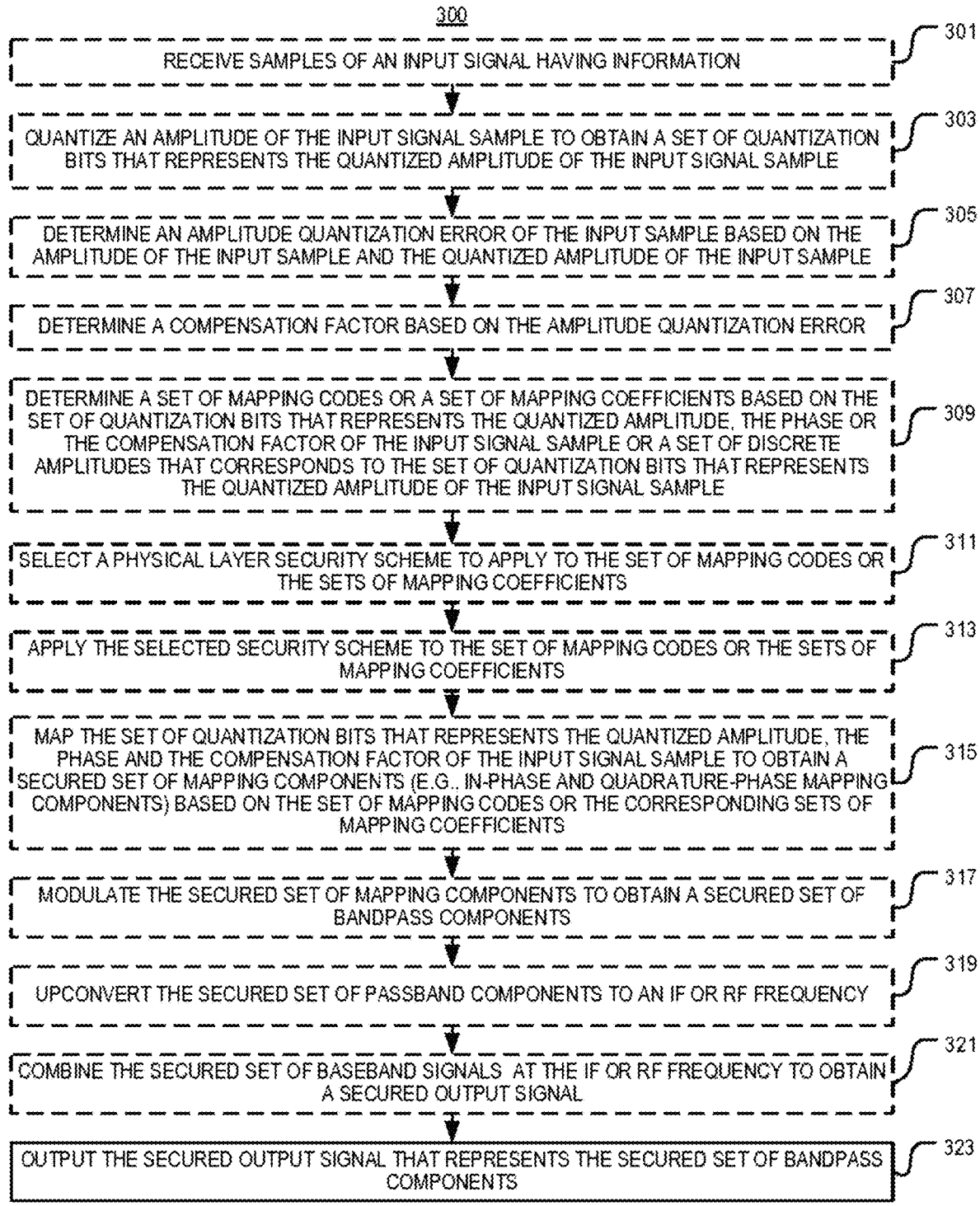
FIG. 3 illustrates another embodiment of a method of providing physical layer security in accordance with various aspects as described herein.

FIG. 3 illustrates another embodiment of a method 300 of providing physical layer security in accordance with various aspects as described herein. In FIG. 3, the method 300 may start, for instance, at block 301 where it can include receiving samples of an input signal having information. At block 303, the method 300 can include quantizing an amplitude of the input signal sample to obtain a set of quantization bits that represents the quantized amplitude of the input signal sample. At block 305, the method 300 can include determining an amplitude quantization error of the input signal sample based on the difference between the amplitude of the input signal sample and the quantized amplitude of the input signal sample. At block 307, the method 300 can include determining a compensation factor based on the amplitude quantization error. At block 309, the method 300 can include determining a set of mapping codes or a set of mapping coefficients based on the set of quantization bits that represents the quantized amplitude of the input signal sample, the phase of the input signal sample, the compensation factor of the input signal sample, or a set of discrete amplitudes that corresponds to the set of quantization bits. At block 311, the method 300 can include selecting a physical layer security scheme to apply to the set of mapping codes or the sets of mapping coefficients. At block 313, the method 300 can include applying the selected security scheme to the set of mapping codes or the sets of mapping coefficients. At block 315, the method 300 can include mapping the set of quantization bits that represents the quantized amplitude, the phase or the compensation factor of the input signal sample to obtain a set of mapping components (e.g., in-phase and quadrature-phase mapping components) based on the set of mapping codes or the corresponding sets of mapping coefficients. At block 317, the method 300 can include modulating the secured set of mapping components to obtain a secured set of bandpass components. At block 319, the method 300 can include upconverting the secured set of bandpass components to an intermediate frequency (IF) or a carrier frequency to obtain a secured set of bandpass components at the IF or Radio Frequency (RF). At block 321, the method 300 can include combining the secured set of bandpass components at the IF or RF to obtain a secured output signal. At block 323, the method 300 includes outputting the secured output signal that represents the secured set of bandpass components.

Figure 4:
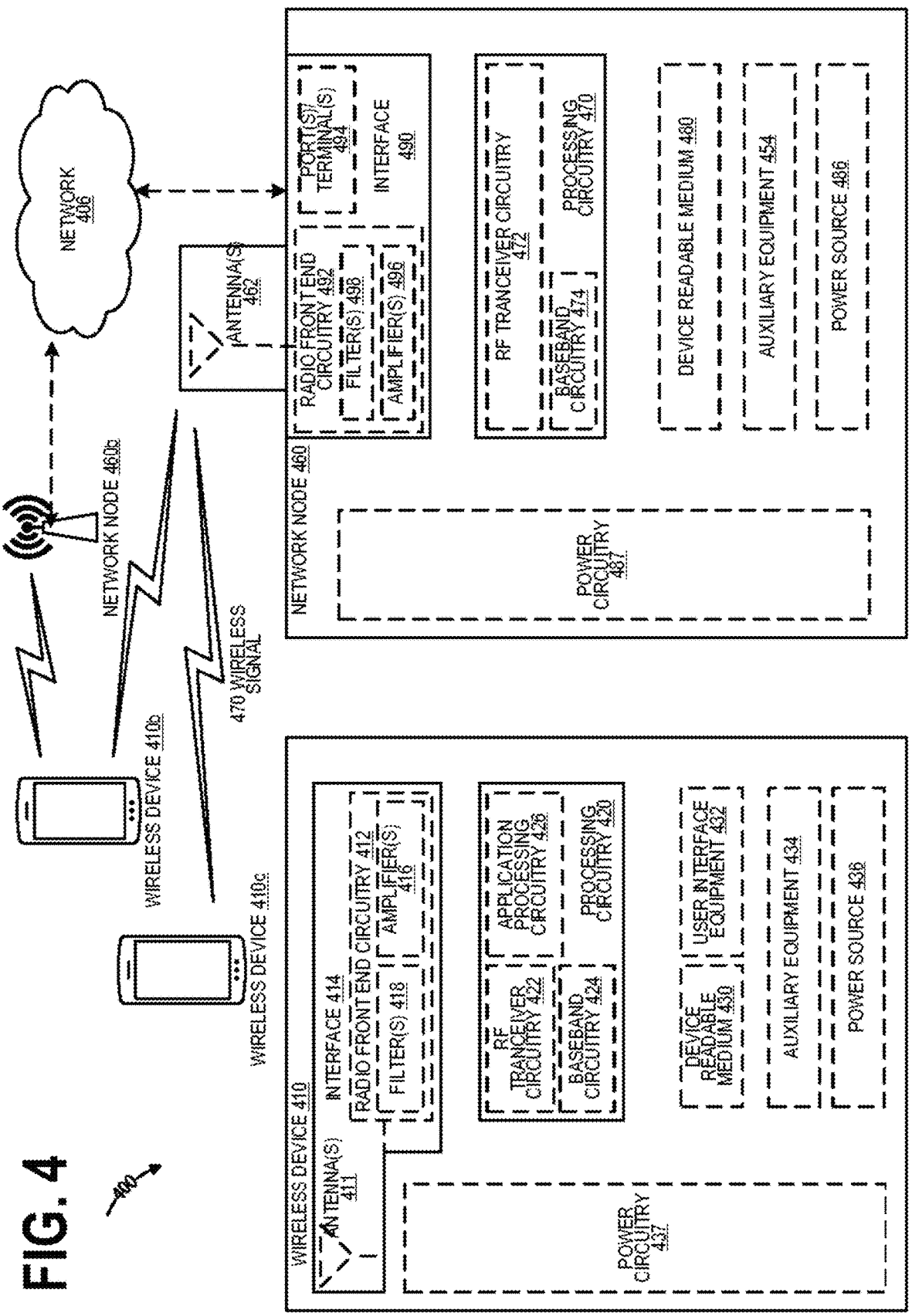
FIG. 4 illustrates one embodiment of a wireless communication network in accordance with various aspects as described herein.

Although the subject matter described herein may be implemented in any appropriate type of system using any suitable components, the embodiments disclosed herein may also be described in relation to a wired or wireless network, such as the example wireless and wired networks illustrated in FIG. 4. For simplicity, the wired network portion of FIG. 4 depicts network 406 communicatively coupled to network nodes 460, 460*b*, and the wireless network portion of FIG. 4 depicts wireless devices 410, 410*b* and 410*c* communicatively coupled to network nodes 460, 460*b*. In practice, a wired and wireless network may further include any additional elements suitable to support communication between wired and wired devices, wireless and wireless devices, wired and wireless devices, or between a wired or wireless device and another communication device, such as a landline telephone, a service provider, or any other network node or end device. Of the illustrated components, network node 460 and wireless device 410 are depicted with additional detail. Network 406 may provide communication and other types of services to one or more devices to facilitate the devices' access to and/or use of the services provided by, or via, the network 406.

Network 406 may comprise and/or interface with any type of communication, telecommunication, data, cellular, and/or radio network or other similar type of system. In some embodiments, network 406 may be configured to operate according to specific standards or other types of predefined rules or procedures. Thus, particular embodiments of network 406 may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, 5G, 6G standards; wireless local area network (WLAN) standards, such as the IEEE 402.11 standards; and/or any other appropriate wireless communication standard, such as the Worldwide Interoperability for Microwave Access (WiMax), Bluetooth, Z-Wave and/or ZigBee standards.

Network 406 may comprise one or more backhaul networks, core networks, internet protocol (IP) networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 460 and wireless device 410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wired or wireless device and/or with other network nodes or equipment in the network to enable and/or provide access to the device and/or to perform other functions (e.g., administration) in the network. Examples of network nodes include, but are not limited to, access points (APs) (e.g., radio access points), base stations (BSs) (e.g., radio base stations, Node Bs, evolved Node Bs (eNBs), and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable wired or wireless device (or group of devices) capable, configured, arranged, and/or operable to enable and/or provide a wired or wireless device with access to the network or to provide some service to a wired or wireless device that has accessed the network.

In FIG. 4, network node 460 includes processing circuitry 470, device readable medium 480, interface 490, auxiliary equipment 454, power source 486, power circuitry 487, antenna 462, or the like. Although network node 460 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 460 are depicted as single boxes located within a larger box, or nested within multiple boxes, in practice, a network node may comprise multiple different physical components that make up a single illustrated component (e.g., device readable medium 480 may comprise multiple separate hard drives as well as multiple random access memory (RAM) modules).

Similarly, network node 460 may be composed of multiple physically separate components (e.g., a NodeB component and a RNC component, or a BTS component and a BSC component, etc.), which may each have their own respective components. In certain scenarios in which network node 460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 460 may be configured to support multiple radio access technologies (RATs). In such embodiments, some components may be duplicated (e.g., separate device readable medium 480 for the different RATs) and some components may be reused (e.g., the same antenna 462 may be shared by the RATs). Network node 460 may also include multiple sets of the various illustrated components for different wireless technologies integrated into network node 460, such as, for example, GSM, code division access (CDMA), wideband CDMA (WCDMA), LTE, NR, Wi-Fi, or Bluetooth wireless technologies. These wireless technologies may be integrated into the same or different chip or set of chips and other components within network node 460.

Processing circuitry 470 is configured to perform any determining, calculating, or similar operations (e.g., certain obtaining operations) described herein as being provided by a network node. These operations performed by processing circuitry 470 may include processing information obtained by processing circuitry 470 by, for example, converting the obtained information into other information, comparing the obtained information or converted information to information stored in the network node, and/or performing one or more operations based on the obtained information or converted information, and as a result of said processing making a determination.

Processing circuitry 470 may comprise a combination of one or more of a microprocessor, controller, microcontroller, central processing unit, digital signal processor, application-specific integrated circuitry, field programmable gate array, or any other suitable computing device, resource, or combination of hardware, software and/or encoded logic operable to provide, either alone or in conjunction with other network node 460 components, such as device readable medium 480, network node 460 functionality. For example, processing circuitry 470 may execute instructions stored in device readable medium 480 or in memory within processing circuitry 470. Such functionality may include providing any of the various wireless features, functions, or benefits discussed herein. In some embodiments, processing circuitry 470 may include a system on a chip (SOC).

In some embodiments, processing circuitry 470 may include one or more of RF transceiver circuitry 472 and baseband circuitry 474. In some embodiments, RF transceiver circuitry 472 and baseband circuitry 474 may be on separate chips (or sets of chips), boards, or units, such as radio units and digital units. In alternative embodiments, part or all of RF transceiver circuitry 472 and baseband circuitry 474 may be on the same chip or set of chips, boards, or units. The embodiments described by this disclosure can be implemented for the network node 460 in the interface 490 and/or the processing circuitry 470. Further, the embodiments described by this disclosure can be implemented for the wireless device or user equipment 410 in the interface 414 and/or the processing circuitry 420.

In certain embodiments, some or all the functionality described herein as being provided by a network node, base station, eNB or other such network device may be performed by processing circuitry 470 executing instructions stored on device readable medium 480 or memory within processing circuitry 470. In alternative embodiments, some or all of the functionality may be provided by processing circuitry 470 without executing instructions stored on a separate or discrete device readable medium, such as in a hard-wired manner. In any of those embodiments, whether executing instructions stored on a device readable storage medium or not, processing circuitry 470 may be configured to perform the described functionality. The benefits provided by such functionality are not limited to processing circuitry 470 alone or to other components of network node 460 but are enjoyed by network node 460 as a whole, and/or by end users and the wireless network generally.

Device readable medium 480 may comprise any form of volatile or non-volatile computer readable memory including, without limitation, persistent storage, solid-state memory, remotely mounted memory, magnetic media, optical media, RAM, ROM, mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 470. Device readable medium 480 may store any suitable instructions, data or information, including a computer program, software, an application including one or more of logic, rules, code, tables, etc. and/or other instructions capable of being executed by processing circuitry 470 and, utilized by network node 460. Device readable medium 480 may be used to store any calculations made by processing circuitry 470 and/or any data received via interface 490. In some embodiments, processing circuitry 470 and device readable medium 480 may be considered to be integrated.

Interface 490 is used in the wired or wireless communication of signaling and/or data between network node 460, network 406, and/or wireless devices 410. As illustrated, interface 490 comprises port(s)/terminal(s) 494 to send and receive data, for example to and from network 406 over a wired connection. Interface 490 also includes radio front end circuitry 492 that may be coupled to, or in certain embodiments a part of, antenna 462. Radio front end circuitry 492 comprises filters 498 and power amplifiers 496. Radio front end circuitry 492 may be coupled to antenna 462 and processing circuitry 470. Radio front end circuitry may be configured to condition signals communicated between antenna 462 and processing circuitry 470. Radio front end circuitry 492 may receive digital data that is to be sent out to other network nodes or wireless devices via a wireless connection. Radio front end circuitry 492 may convert the digital data into a radio signal having the appropriate channel and bandwidth parameters using a combination of filters 498 and/or amplifiers 496. The radio signal may then be transmitted via antenna 462. Similarly, when receiving data, antenna 462 may collect radio signals which are then converted into digital data by radio front end circuitry 492. The digital data may be passed to processing circuitry 470. In other embodiments, the interface may comprise different components and/or different combinations of components.

In certain alternative embodiments, network node 460 may not include separate radio front end circuitry 492, instead, processing circuitry 470 may comprise radio front end circuitry and may be coupled to antenna 462 without separate radio front end circuitry 492. Similarly, in some embodiments, all or some of RF transceiver circuitry 472 may be considered a part of interface 490. In still other embodiments, interface 490 may include one or more ports or terminals 494, radio front end circuitry 492, and RF transceiver circuitry 472, as part of a radio unit (not shown), and interface 490 may communicate with baseband circuitry 474, which is part of a digital unit (not shown).

Antenna 462 may include one or more antennas, or antenna arrays, configured to send and/or receive wireless signals. Antenna 462 may be coupled to radio front end circuitry 492 and may be any type of antenna capable of transmitting and receiving data and/or signals wirelessly. In some embodiments, antenna 462 may comprise one or more omni-directional, sector or panel antennas operable to transmit/receive radio signals between, for example, 2 GHZ and 6 GHz. An omni-directional antenna may be used to transmit/receive radio signals in any direction, a sector antenna may be used to transmit/receive radio signals from devices within a particular area, and a panel antenna may be a line-of-sight antenna used to transmit/receive radio signals in a relatively straight line. In some instances, the use of more than one antenna may be referred to as multiple-input multiple-output (MIMO). In certain embodiments, antenna 462 may be separate from network node 460 and may be connectable to network node 460 through an interface or port.

Antenna 462, interface 490, and/or processing circuitry 470 may be configured to perform any receiving operations and/or certain obtaining operations described herein as being performed by a network node. Any information, data and/or signals may be received from a wireless device, another network node and/or any other network equipment. Similarly, antenna 462, interface 490, and/or processing circuitry 470 may be configured to perform any transmitting operations described herein as being performed by a network node. Any information, data and/or signals may be transmitted to a wireless device, another network node and/or any other network equipment.

Power circuitry 487 may comprise, or be coupled to, power management circuitry and is configured to supply the components of network node 460 with power for performing the functionality described herein. Power circuitry 487 may receive power from power source 486. Power source 486 and/or power circuitry 487 may be configured to provide power to the various components of network node 460 in a form suitable for the respective components (e.g., at a voltage and current level needed for each respective component). Power source 486 may either be included in, or external to, power circuitry 487 and/or network node 460. For example, network node 460 may be connectable to an external power source (e.g., an electricity outlet) via an input circuitry or interface such as an electrical cable, whereby the external power source supplies power to power circuitry 487. As a further example, power source 486 may comprise a source of power in the form of a battery or battery pack which is coupled to, or integrated in, power circuitry 487. The battery may provide backup power should the external power source fail. Other types of power sources, such as photovoltaic devices, may also be used.

Alternative embodiments of network node 460 may include additional components beyond those shown in FIG. 4 that may be responsible for providing certain aspects of the network node's functionality, including any of the functionality described herein and/or any functionality necessary to support the subject matter described herein. For example, network node 460 may include user interface equipment to allow input of information into network node 460 and to allow output of information from network node 460. This may allow a user to perform diagnostic, maintenance, repair, and other administrative functions for network node 460.

As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc., A wireless device may support device-to-device (D2D) communication, for example by implementing a 3rd Generation Partnership Project (3GPP) standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 410 includes antenna 411, interface 414, processing circuitry 420, device readable medium 430, user interface equipment 432, auxiliary equipment 434, power source 436 power circuitry 437, or the like. Wireless device 410 may include multiple sets of one or more of the illustrated components for different wireless technologies supported by wireless device 410, such as, for example, GSM, WCDMA, LTE, NR, Wi-Fi, WiMAX, NB-IoT, or Bluetooth wireless technologies, just to mention a few. These wireless technologies may be integrated into the same or different chips or set of chips as other components within wireless device 410.

Antenna 411 may include one or more antennas or antenna arrays, configured to send and/or receive wireless signals, and is coupled to interface 414. In certain alternative embodiments, antenna 411 may be separate from wireless device 410 and be connectable to wireless device 410 through an interface or port. Antenna 411, interface 414, and/or processing circuitry 420 may be configured to perform any receiving or transmitting operations described herein as being performed by a wireless device. Any information, data and/or signals may be received from a network node and/or another wireless device. In some embodiments, radio front end circuitry and/or antenna 411 may be considered an interface.

As illustrated, interface 414 comprises radio front end circuitry 412 and antenna 411. Radio front end circuitry 412 comprises one or more filters 418 and power amplifiers 416. Radio front end circuitry 412 is coupled to antenna 411 and processing circuitry 420 and is configured to condition signals communicated between antenna 411 and processing circuitry 420. Radio front end circuitry 412 may be coupled to or a part of antenna 411. In some embodiments, wireless device 410 may not include separate radio front end circuitry 412; rather, processing circuitry 420 may comprise radio front end circuitry and may be coupled to antenna 411. Similarly, in some embodiments, some or all of RF transceiver circuitry 422 may be considered a part of interface 414. Radio front end circuitry 412 may receive digital data that is to be sent out to other network nodes or wireless devices via a wireless connection. Radio front end circuitry 412 may convert the digital data into a radio signal having the appropriate channel and bandwidth parameters using a combination of filters 418 and/or amplifiers 416. The radio signal may then be transmitted via antenna 411. Similarly, when receiving data, antenna 411 may collect radio signals which are then converted into digital data by radio front end circuitry 412. The digital data may be passed to processing circuitry 420. In other embodiments, the interface may comprise different components and/or different combinations of components.

Processing circuitry 420 may comprise a combination of one or more of a microprocessor, controller, microcontroller, central processing unit, digital signal processor, application-specific integrated circuitry, field programmable gate array, or any other suitable computing device, resource, or combination of hardware, software, and/or encoded logic operable to provide, either alone or in conjunction with other wireless device 410 components, such as device readable medium 430, wireless device 410 functionality. Such functionality may include providing any of the various wireless features or benefits discussed herein. For example, processing circuitry 420 may execute instructions stored in device readable medium 430 or in memory within processing circuitry 420 to provide the functionality disclosed herein.

As illustrated, processing circuitry 420 includes one or more of RF transceiver circuitry 422, baseband circuitry 424, and application processing circuitry 426. In other embodiments, the processing circuitry may comprise different components and/or different combinations of components. In certain embodiments processing circuitry 420 of wireless device 410 may comprise a SOC. In some embodiments, RF transceiver circuitry 422, baseband circuitry 424, and application processing circuitry 426 may be on separate chips or sets of chips. In alternative embodiments, part or all of baseband circuitry 424 and application processing circuitry 426 may be combined into one chip or set of chips, and RF transceiver circuitry 422 may be on a separate chip or set of chips. In still alternative embodiments, part or all of RF transceiver circuitry 422 and baseband circuitry 424 may be on the same chip or set of chips, and application processing circuitry 426 may be on a separate chip or set of chips. In yet other alternative embodiments, part or all of RF transceiver circuitry 422, baseband circuitry 424, and application processing circuitry 426 may be combined in the same chip or set of chips. In some embodiments, RF transceiver circuitry 422 may be a part of interface 414. RF transceiver circuitry 422 may condition RF signals for processing circuitry 420.

In certain embodiments, some or all of the functionality described herein as being performed by a wireless device may be provided by processing circuitry 420 executing instructions stored on device readable medium 430, which in certain embodiments may be a computer-readable storage medium. In alternative embodiments, some or all of the functionality may be provided by processing circuitry 420 without executing instructions stored on a separate or discrete device readable storage medium, such as in a hard-wired manner. In any of those particular embodiments, whether executing instructions stored on a device readable storage medium or not, processing circuitry 420 may be configured to perform the described functionality. The benefits provided by such functionality are not limited to processing circuitry 420 alone or to other components of wireless device 410 but are enjoyed by wireless device 410 as a whole, and/or by end users and the wireless network generally.

Processing circuitry 420 may be configured to perform any determining, calculating, or similar operations (e.g., certain obtaining operations) described herein as being performed by a wireless device. These operations, as performed by processing circuitry 420, may include processing information obtained by processing circuitry 420 by, for example, converting the obtained information into other information, comparing the obtained information or converted information to information stored by wireless device 410, and/or performing one or more operations based on the obtained information or converted information, and as a result of said processing making a determination.

Device readable medium 430 may be operable to store a computer program, software, an application including one or more of logic, rules, code, tables, etc. and/or other instructions capable of being executed by processing circuitry 420. Device readable medium 430 may include computer memory (e.g., RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by processing circuitry 420. In some embodiments, processing circuitry 420 and device readable medium 430 may be considered to be integrated.

User interface equipment 432 may provide components that allow for a human user to interact with wireless device 410. Such interaction may be of many forms, such as visual, audial, tactile, etc. User interface equipment 432 may be operable to produce output to the user and to allow the user to provide input to wireless device 410. The type of interaction may vary depending on the type of user interface equipment 432 installed in wireless device 410. For example, if wireless device 410 is a smart phone, the interaction may be via a touch screen; if wireless device 410 is a smart meter, the interaction may be through a screen that provides usage (e.g., the number of gallons used) or a speaker that provides an audible alert (e.g., if smoke is detected). User interface equipment 432 may include input interfaces, devices and circuitry, and output interfaces, devices and circuitry. User interface equipment 432 is configured to allow input of information into wireless device 410 and is coupled to processing circuitry 420 to allow processing circuitry 420 to process the input information. User interface equipment 432 may include, for example, a microphone, a proximity or other sensor, keys/buttons, a touch display, one or more cameras, a USB port, or other input circuitry. User interface equipment 432 is also configured to allow output of information from wireless device 410, and to allow processing circuitry 420 to output information from wireless device 410. User interface equipment 432 may include, for example, a speaker, a display, vibrating circuitry, a USB port, a headphone interface, or other output circuitry. Using one or more input and output interfaces, devices and circuitry of user interface equipment 432, wireless device 410 may communicate with end users and/or the wireless network and allow them to benefit from the functionality described herein.

Auxiliary equipment 434 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 434 may vary depending on the embodiment and/or scenario.

Power source 436 may, in some embodiments, be in the form of a battery or battery pack. Other types of power sources, such as an external power source (e.g., an electricity outlet), photovoltaic devices or power cells, may also be used. The wireless device 410 may further comprise power circuitry 437 for delivering power from power source 436 to the various parts of wireless device 410 which need power from power source 436 to carry out any functionality described or indicated herein. Power circuitry 437 may in certain embodiments comprise power management circuitry. Power circuitry 437 may additionally or alternatively be operable to receive power from an external power source; in which case wireless device 410 may be connectable to the external power source (such as an electricity outlet) via input circuitry or an interface such as an electrical power cable. Power circuitry 437 may also be operable in certain embodiments to deliver power from an external power source to power source 436. This may be, for example, for the charging of power source 436. Power circuitry 437 may perform any formatting, converting, or other modification to the power from power source 436 to make the power suitable for the respective components of wireless device 410 to which power is supplied.

Figure 5:
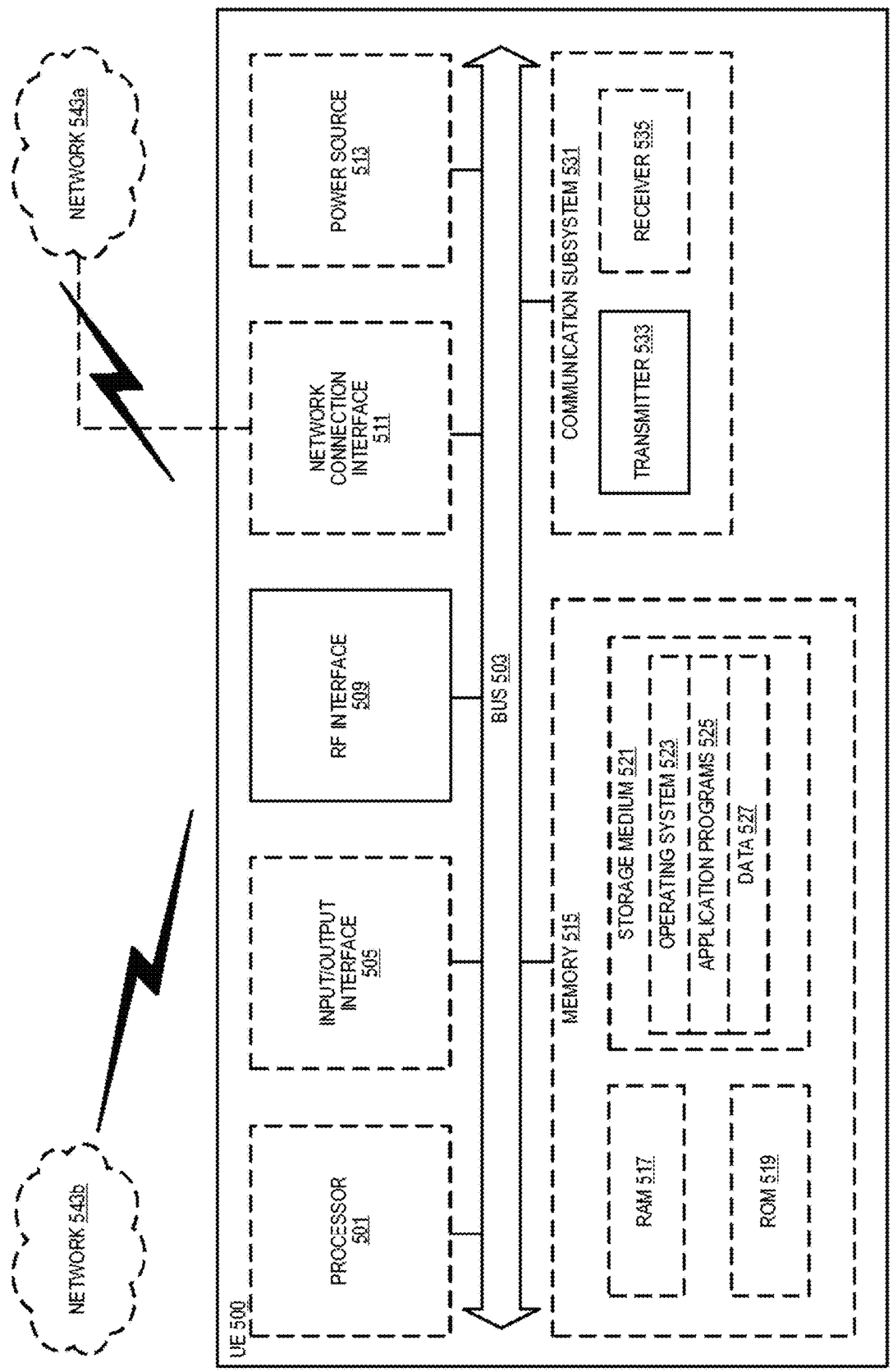
FIG. 5 illustrates one embodiment of an electronic device in accordance with various aspects as described herein.

FIG. 5 illustrates one embodiment of an electronic device 500 in accordance with various aspects described herein. As used herein, the device 500 can be a wired device or a wireless device. Further, the device 500 may not necessarily have a user in the sense of a human user who owns and/or operates the relevant device. Instead, the device 500 may represent a device that is intended for sale to, or operation by, a human user but which may not, or which may not initially, be associated with a specific human user (e.g., a smart sprinkler controller, IoT device). Alternatively, the device 500 may represent a device that is not intended for sale to, or operation by, an end user but which may be associated with or operated for the benefit of a user (e.g., a smart power meter). The device 500 may be any device identified by the 3rd 3GPP, including a NB-IoT device, a machine type communication (MTC) device, and/or an enhanced MTC (eMTC) device. The device 500, as illustrated in FIG. 5, is one example of a wired or wireless device such as configured for communication in accordance with one or more communication standards promulgated by the 3GPP, such as 3GPP's GSM, UMTS, LTE, 5G, 6G, Wi-Fi 6 (802.11ax), 3GPP Rel 17, DVB-S2X, wired communications, and satellite communications standards. Accordingly, the components discussed herein can be applicable to a wired or wireless device.

As used herein, a wired device refers to a device that can be communicatively coupled to another device or network via a physical connection. A wired device can include a computer peripheral device, an audio or visual device, a networking device, a game console or accessory device, an industrial or medical equipment device, a home appliance device, an office device, another device, the like, or any combination thereof. A computer peripheral device can include a keyboard (e.g., coupled via USB or PS/2 cable), a mouse (e.g., coupled via USB or PS/2 cable), a monitor (e.g., coupled via HDMI, VGA, DVI, Display Port or USB cable), a printer (e.g., coupled via USB, Ethernet, or parallel port cable), a hard drive (e.g., coupled via USB, Thunderbolt or eSATA cable), a scanner (e.g., coupled via USB or Ethernet cable), a webcam (e.g., coupled via USB cable), the like, or any combination thereof. An audio or visual device can include a headphone (e.g., coupled via 3.5 mm audio jacks or USB cable), a speaker (e.g., coupled via 3.5 mm jacks, RCA cable or optical audio cable), a microphone (e.g., coupled via XLR, USB, or 3.5 mm cable), a home theater device (e.g., coupled via HDMI, RCA or optical cable), a projector (e.g., coupled via HDMI, VGA, Display Port or USB cable), the like, or any combination thereof. A networking device can include a router (e.g., coupled via Ethernet cable), a modem (e.g., coupled via Ethernet cable), a switch (e.g., coupled via Ethernet cable), an Ethernet adapter (e.g., coupled via Ethernet cable), the like, or any combination thereof. A game console or accessory device can include a game controller (e.g., coupled via USB cables), a gaming headset (e.g., coupled over USB or 3.5 mm jack cable), a console-to-TV connection (e.g., coupled over an HDMI or component cable), the like, or any combination thereof. An industrial or medical equipment device can include a CNC machine (e.g., coupled via serial or USB cable), a medical monitor (e.g., ECG, EEG), a laboratory instrument (e.g., coupled via USB or RS232 cable), the like, or any combination thereof. A home appliance device can include a wired security camera (e.g., coupled over coaxial cables), a smart thermostat (e.g., coupled over Ethernet cable), a wired smoke detector (e.g., coupled over a home's electrical system), the like, or any combination thereof. An office equipment device can include a fax machine (e.g., coupled via phone or USB cable), a wired telephone (e.g., coupled via telephone cable), a photocopier (e.g., coupled via USB or Ethernet cable), the like, or any combination thereof. Other devices can include a barcode scanner (e.g., coupled via USB or serial cable), a POS terminal (e.g., coupled via USB or serial cable), a digital camera (e.g., coupled via USB or HDMI cable), a power supply (e.g., coupled via power cable).

In FIG. 5, the device 500 includes processing circuitry 501 that is operatively coupled to input/output interface 505, RF interface 509, network connection interface 511, memory 515 including RAM 517, ROM 519, and storage medium 521 or the like, communication subsystem 531, power source 513, and/or any other component, or any combination thereof. Storage medium 521 includes operating system 523, application program 525, and data 527. In other embodiments, storage medium 521 may include other similar types of information. Certain devices may utilize all of the components shown in FIG. 5, or only a subset of the components. The level of integration between the components may vary from one device to another device. Further, certain devices may contain multiple instances of a component, such as multiple processors, memories, transceivers, transmitters, receivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, application specific integrated circuits (ASICs), etc.); programmable logic together with appropriate firmware; one or more stored program, general-purpose processors, such as a microprocessor or a DSP, together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. Device 500 may be configured to use an output device via input/output interface 505. An output device may use the same type of interface port as an input device. For example, a USB port may be used to provide input to and output from device 500. The output device may be a speaker, a sound card, a video card, a display, a monitor, a printer, an actuator, an emitter, a smartcard, another output device, or any combination thereof. Device 500 may be configured to use an input device via input/output interface 505 to allow a user to capture information into device 500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 509 may be configured to provide a communication interface to RF components such as a transmitter, a receiver, and an antenna. Network connection interface 511 may be configured to provide a communication interface to network 543a. Network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. Network connection interface 511 may be configured to include a receiver and a transmitter interface used to communicate with one or more other devices over a communication network according to one or more communication protocols, such as Ethernet, TCP/IP, SONET, asynchronous transmit mode (ATM), or the like. Network connection interface 511 may implement receiver and transmitter functionality appropriate to the communication network links (e.g., optical, electrical, and the like). The transmitter and receiver functions may share circuitry components, software or firmware, or alternatively may be implemented separately.

RAM 517 may be configured to interface via bus 503 to processing circuitry 501 to provide storage or caching of data or computer instructions during the execution of software programs such as the operating system, application programs, and device drivers. ROM 519 may be configured to provide computer instructions or data to processing circuitry 501. For example, ROM 519 may be configured to store invariant low-level system code or data for basic system functions such as basic input and output (I/O), startup, or reception of keystrokes from a keyboard that are stored in a non-volatile memory. Storage medium 521 may be configured to include memory such as RAM, ROM, PROM, EPROM, EEPROM, magnetic disks, optical disks, floppy disks, hard disks, removable cartridges, or flash drives. In one example, storage medium 521 may be configured to include operating system 523, application program 525 such as a web browser application, a widget or gadget engine or another application, and data file 527. Storage medium 521 may store, for use by device 500, any of a variety of various operating systems or combinations of operating systems.

Storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 521 may allow device 500 to access computer-executable instructions, application programs or the like, stored on transitory or non-transitory memory media, to off-load data, or to upload data. An article of manufacture, such as one utilizing a communication system may be tangibly embodied in storage medium 521, which may comprise a device readable medium.

In FIG. 5, processing circuitry 501 may be configured to communicate with network 543b using communication subsystem 531. Network 543a and network 543b may be the same network or networks or different network or networks. Communication subsystem 531 may be configured to include one or more transceivers used to communicate with network 543b. For example, communication subsystem 531 may be configured to include one or more transceivers used to communicate with one or more remote transceivers of another device capable of wireless communication such as another wireless device, device, or base station of a radio access network (RAN) according to one or more communication protocols, such as IEEE 802.11, CDMA, WCDMA, GSM, LTE, UMTS terrestrial radio access network (UTRAN), WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuitry components, software or firmware, or alternatively may be implemented separately.

In the illustrated embodiment, the communication functions of communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 531 may include cellular communication, Wi-Fi communication, Bluetooth communication, and GPS communication. Network 543b may encompass wired and/or wireless networks such as a LAN, a WAN, a computer network, a wireless network, a telecommunications network, another like network or any combination thereof. For example, network 543b may be a cellular network, a Wi-Fi network, and/or a near-field network. Power source 513 may be configured to provide alternating current (AC) or direct current (DC) power to components of device 500.

The features, benefits and/or functions described herein may be implemented in one of the components of device 500 or partitioned across multiple components of device 500. Further, the features, benefits, and/or functions described herein may be implemented in any combination of hardware, software or firmware. In one example, communication subsystem 531 may be configured to include any of the components described herein. Further, processing circuitry 501 may be configured to communicate with any of such components over bus 503. In another example, any of such components may be represented by program instructions stored in memory that when executed by processing circuitry 501 perform the corresponding functions described herein. In another example, the functionality of any of such components may be partitioned between processing circuitry 501 and communication subsystem 531. In another example, the non-computationally intensive functions of any of such components may be implemented in software or firmware and the computationally intensive functions may be implemented in hardware. The embodiments described by this disclosure can be implemented for the device 500 in the RF interface circuitry 509 or the transmitter circuitry 533 of the communication subsystem 531.

Electronic communication systems increasingly demand security mechanisms that can operate at the physical layer, enabling secured transmissions without reliance on higher-layer cryptographic protocols. Traditional approaches often require key exchanges, add latency, or introduce incompatibility with existing communication standards. There is a need for transmitter-side physical-layer security techniques that are compatible with standard signal formats and protocols, do not rely on cryptographic handshakes, and can be embedded into low-power or stateless devices. In wireless environments, characteristics such as multipath propagation and Doppler effects can be exploited to generate keying material unique to a specific time and location. However, such solutions often require coordinated protocols or feedback exchanges that reduce their practicality in stateless or adversarial scenarios.

The present disclosure further relates to systems and methods that provide transparent and reproducible secure key generation implemented at the physical layer of electronic devices. Conventional communication security solutions are typically based on cryptographic schemes that rely on complex algorithms and secure key exchange mechanisms. These include public key cryptographic protocols such as Diffie-Hellman and RSA. Such approaches depend heavily on the quality of the algorithm, the randomness and security of the keying material, and the integrity of key distribution methods. While these methods have proven effective, they come with costs in terms of computational resources, key management complexity, and exposure to attacks.

The present disclosure also includes embodiments that integrate communication signal decomposition and physical layer transformation in a manner that enables simultaneous secure key generation at both transmitting and receiving ends, without requiring explicit coordination or observable key exchanges. These systems utilize signal decomposition to represent time-variant envelope signals as a set of quantized, constant-envelope components. These components are then modified according to a security transformation applied at the physical layer. Unlike traditional encryption techniques, the transformation applied in this framework is transparent. It leaves no measurable impact on signal timing, structure, or overhead that would allow an adversary to distinguish a protected communication from any other signal. This ensures that secure communications are indistinguishable from standard transmissions and do not raise suspicion or trigger monitoring protocols.

In one embodiment, a wireless device decomposes a sampled baseband signal into directional and amplitude components. The amplitude values are quantized to produce a digital representation suitable for security transformation. The transformation involves applying a mapping rule such as permutation, puncturing, or phase shifting. The selection of the mapping rule is governed by a state machine or local condition internal to the device, such as a rolling counter or internal timer. The same internal condition can be used to derive a secure key simultaneously with obtaining the signal components, enabling both sender and receiver to generate matching keys without communicatively exchanging the secure key. The result is a reproducible, stateless, and secure key generation method.

In some embodiments, electronic devices can include default security configurations. For instance, electronic devices may be factory-shipped with a baseline security state that includes predefined mapping rules and state transition logic. Each device may begin in a default permutation or puncturing sequence and store recent security settings locally to attempt synchronization if interrupted. Flags embedded in normal communication overhead may instruct devices to erase or replace sequences or switch transformation modes. Devices may also construct new transformation rules in real-time based on received flag sequences, providing dynamic security reconfiguration. For example, a user operating in a high-risk environment may purchase or use an off-the-shelf electronic device. Upon calling a pre-configured secure number, the device may receive flag sequences that trigger creation or switching of security transformations. These transformations are stored on the device and subsequently used to enable secure communications with other trusted devices. At a later time, the device may call a separate number to receive flags that erase stored security information. The transparency of this system ensures that no aspect of the communication-neither the content, protocol, nor signal characteristics-suggests that encryption or security is being applied. The use of ordinary hardware, software, and standard network services further obscures the presence of any protection mechanism.

Figure 6A:
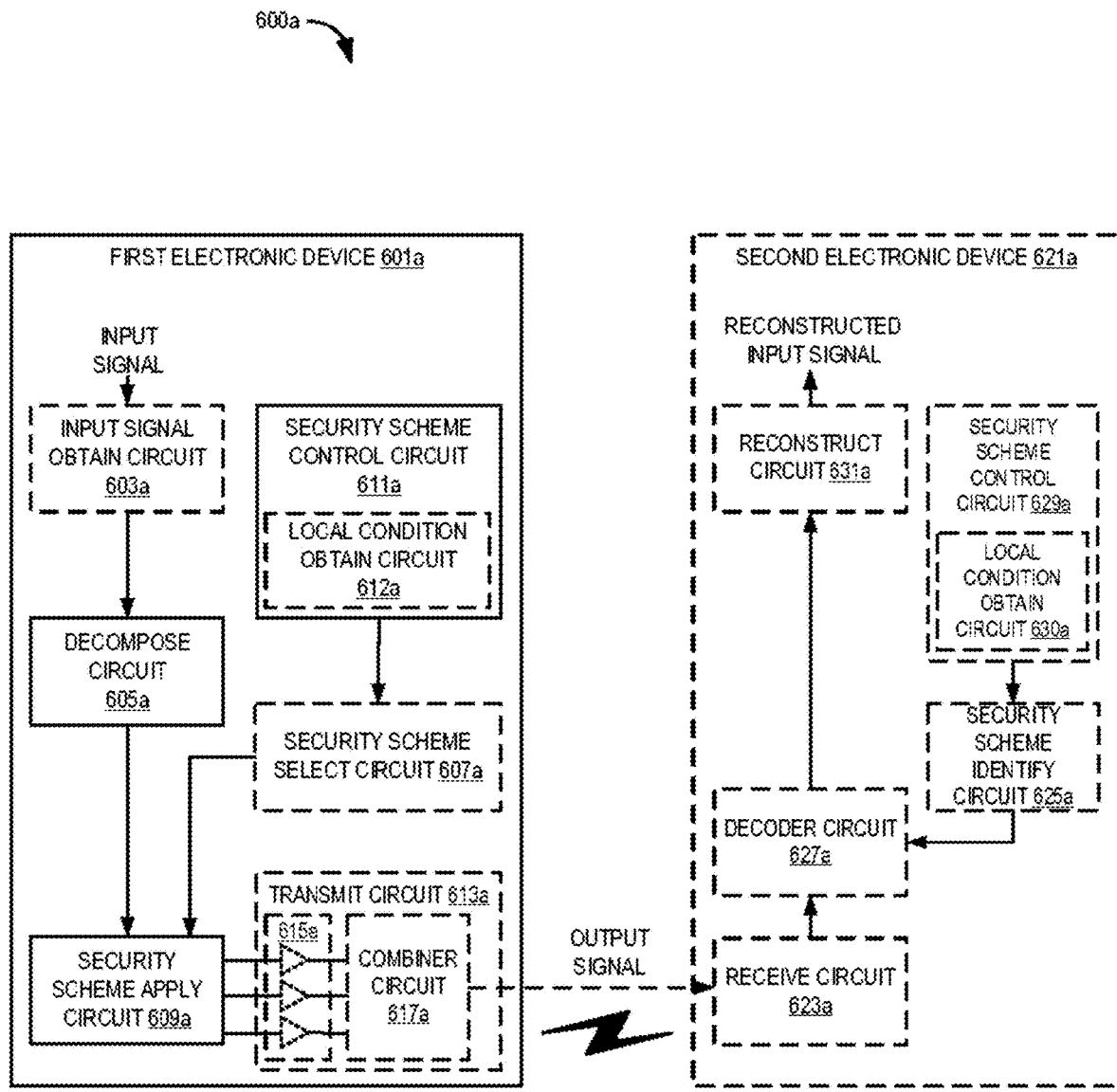
FIG. 6A illustrates one embodiment of a system of performing transparent physical layer security in accordance with various aspects as described herein.

FIG. 6A illustrates one embodiment of a system 600a of performing transparent physical layer security in accordance with various aspects as described herein. In FIG. 6A, the system 600a includes a first electronic device 601a communicatively coupled (e.g., wired or wireless communication link) to a second electronic device 621a. The first electronic device 601a can include an input signal obtain circuitry 603a operable to obtain a digital representation of an input signal; a decompose circuitry 605a operable to decompose the digital representation of the input signal into a set of signal components; a security scheme select circuitry 607a operable to select a physical layer security scheme from a set of predefined, non-cryptographic mapping rules; a security scheme application or transformation circuitry 609a operable to apply the physical layer security scheme to transform the signal components; a security scheme control circuitry 611a operable to control the application of the physical layer security scheme based on one or more local conditions internal to the electronic device and without requiring external key coordination; a local condition obtain circuit 612a to obtain one or more local conditions internal to the first electronic device 601a; a transmit circuit 613a operable to output the output signal; the like; or any combination thereof. The decompose circuitry 605a can decompose the digital representation of the input signal into a set of signal components. In certain embodiments, a sampling circuitry can be operable to sample the input signal to obtain the digital representation of the input signal. The digital representation of an input signal can refer to a set of discrete numerical values that approximate or encode a continuous-time analog signal for processing, storage, or transmission. This representation can be obtained through a process of sampling and quantization. Sampling captures the amplitude of the signal at uniform time intervals, and quantization maps each sampled value to a finite set of numerical levels, producing a sequence of digital values that approximate the original waveform. In communication systems employing physical layer transformations, the digital representation of an input signal can be further processed into a structured form suitable for secure encoding. For instance, the sampled and quantized signal may be decomposed into a set of signal components, each representing a portion of the signal's energy or modulation characteristics. These components may include directional information (e.g., phase or angle) and amplitude information (e.g., magnitude), often expressed in polar coordinates. The use of polar decomposition allows for efficient encoding and transformation of the signal while preserving its original characteristics. Each signal component in the digital representation can be associated with a quantization bit pattern or mapping index that corresponds to a particular amplitude range or directional segment. This structured decomposition into signal components forms the basis for applying non-cryptographic transformations, such as permutation, puncturing, or phase rotation. These transformations operate on individual components or groups of components without altering the overall transmission format, enabling transparent and secure communication.

Furthermore, the security scheme application or transformation circuitry 609a can apply a physical layer security scheme (e.g., secure mapping rule) to modify or transform the signal components. The applied transformation can change the structure of the signal components using non-cryptographic operations. Non-cryptographic operations can refer to techniques for modifying or transforming data that does not rely on conventional cryptographic algorithms such as symmetric or asymmetric encryption, hash functions, or digital signatures. Unlike cryptographic methods, which are designed to ensure confidentiality or authenticity based on computational complexity and secret key management, non-cryptographic operations can achieve security or obfuscation at the physical or structural level without requiring encryption keys or cryptographic primitives. In the context of signal processing and physical layer security, non-cryptographic operations can include actions such as permutation, puncturing, phase shifting, magnitude scaling, reordering of signal components, or the like. For example, permutation involves rearranging signal components according to a predefined or dynamically generated sequence, while puncturing omits specific components from transmission. Phase shifting modifies the angular representation of signal components in a polar coordinate space, and magnitude scaling applies gain adjustments to selected components to alter their signal power. These transformations can be applied at the physical layer and can be designed to be reversible only by receivers that possess the same internal transformation logic or synchronization state. These operations can be transparent to higher-layer communication protocols, introduce no observable changes to the structure or timing of the transmission, and do not trigger key exchange mechanisms. As a result, these transformations can provide a form of security that is undetectable to passive observers and lightweight enough to be implemented in stateless or resource-constrained environments. Non-cryptographic operations can offer a structural or statistical form of security rather than computational intractability, making them well-suited for enhancing security without the overhead of traditional cryptographic systems.

In FIG. 6A, the security scheme control circuitry 611a can determine how and when a transformation is applied based on a local condition obtained from the local condition obtain circuit 612a. A local condition can be referred to as a state, event, signal, input, internal parameter, or the like that originates from or is accessible within an electronic device or which governs operation of the secure mapping rule selection or application. A local condition can include, but is not limited to: a scheduled time or timer-based trigger; a device state or operational mode (e.g., active call state, idle state); a user input or local configuration setting; an internally generated random or pseudorandom value; a state of a local finite state machine; a locally received communication flag embedded within received data or signaling; an error condition, threshold crossing, or internal counter value; a software, firmware, or hardware event within the device; a signal quality metric or measurement made locally (e.g., SNR, BER); a power state (e.g., low power mode, thermal condition); a pre-programmed schedule or lookup condition stored in memory; the like; or any combination thereof. No coordination with a remote device is required to control or synchronize the transformation scheme.

Furthermore, the transmit circuitry 613a can generate an output signal based on the transformed signal components and can transmit the signal in compliance with standard communication formats. In some configurations, the transmit circuitry 613a can include amplifier circuitry 615a, which collectively amplifies the transformed components to suitable transmission levels. For instance, the amplifier circuitry 615a can include a set of amplifiers operable to amplify each signal component followed by a combiner circuitry 617a operable to combine, aggregate or merge the amplified signal components to obtain an output signal. Each amplifier may correspond to a distinct frequency, quantization level, or modulation path. The output can be protocol-compliant and can represent a transformed, secured version of the original signal representation. This configuration enables the system to apply signal transformation at a fine granularity while ensuring that the transmitted signal remains coherent and within modulation compliance. The output from the transmit circuitry 613a may take the form of a secured bandpass signal. The decompose circuitry 605a can operate on the digital representation of the input signal to produce a set of components in a quantized polar format. This format includes directional and amplitude characteristics for each signal instance. Each component may correspond to one or more quantization bits, enabling manipulation of individual bits or encoded component values during transformation. The security scheme application or transformation circuitry 609a can apply a physical layer security scheme to the quantized signal components. The physical layer scheme can be selected from a set of predefined, non-cryptographic mapping rules. These mapping rules may include permutation of signal indices, puncturing of signal elements, phase rotation, magnitude scaling, or the like. The selected transformation can alter the structure of the signal components such that the resulting output is non-inferable to an unintended observer, while remaining compatible with transmission protocols and not requiring re-synchronization at the physical or data link layer. The security scheme control circuitry 611a can determine which transformation to apply. Selection can be based on one or more internal or locally determined conditions, such as a finite state machine state, timing interval, configuration register, or autonomous signal mode. Because the transformation logic is determined internally, the system 600a enables stateless operation and supports autonomous transmission, as well as applications in energy-constrained or non-interactive devices.

In the current embodiment, the second electronic device 621a can includes a receive circuitry 623a operable to receive the output signal transmitted by the first electronic device 601a; a security scheme identification circuit 625a operable to identify or retrieve the corresponding physical layer security scheme based on the one or more local conditions internal to the second electronic device and without requiring external key coordination; a decoder circuitry 627a operable to decode the output signal based on the physical layer security scheme to obtain a decoded set of signal components; a security scheme control circuitry 629a operable to control the application of the physical layer security scheme based on one or more local conditions internal to the electronic device and without requiring external key coordination; a local condition obtain circuit 630a operable to obtain one or more local conditions internal to the second electronic device 621b; a reconstruct circuitry 631b operable reconstruct a representation of the input signal based on the decoded set of signal components; the like; or any combination thereof.

In another embodiment, an electronic device can include an internal finite state machine (FSM) that transitions between states based on events such as transmission cycles, time windows, or detected signal energy levels. The current FSM state determines which physical layer transformation (e.g., permutation, puncturing, or phase rotation) can be applied to signal components. Since the FSM operates deterministically and independently, the same transformation can be applied at both ends without coordination.

In another embodiment, an internal rolling counter can increment at fixed intervals (e.g., per frame or block). The current counter value can be used as an index into a predefined table of transformation rules stored in device memory (e.g., a LUT of 32 different permutations). The selected rule can be used for transforming the signal. Electronic devices with synchronized counters can automatically select the same transformation without exchanging any information.

In another embodiment, a local clock or oscillator can be used to trigger transformation changes at regular intervals (e.g., every 250 ms). Each time a scheduled interval expires, an electronic device can load a new security scheme from memory, using the elapsed time as a key. If both electronic devices use the same initial timestamp and update interval, they can remain synchronized in their transformation logic without any further communication.

In another embodiment, an electronic device can sample internal analog noise sources (e.g., thermal noise, oscillator jitter) to derive pseudo-random values. These values are used to select or modulate physical layer transformations. Because the entropy sources are unique to each device and not shared, this approach can be applied to asymmetric or probabilistic security scenarios, but could still produce reproducible patterns when seeded identically.

In another embodiment, at boot or initialization, an electronic device can seed its transformation schedule based on a stored unique device ID and a startup timestamp. These values can be combined and used to generate a deterministic sequence of transformations. As long as both electronic devices start with the same seed and follow the same sequence logic, they can remain synchronized.

In another embodiment, the physical layer transformation can also be altered based on user interactions (e.g., pressing a secure-call button), application-level instructions, or internal security policy thresholds (e.g., switching schemes after a certain number of transmissions). These triggers can modify local state variables used to determine which transformation to apply, enabling responsive and autonomous changes without external signaling.

Physical layer security techniques are increasingly important in environments where cryptographic key management is impractical or undesired. Traditional approaches to key exchange-such as handshake-based protocols or pre-shared secrets-introduce synchronization requirements, latency, and vulnerability to interception. There remains a need for systems that can generate and derive secure keys simultaneously or contemporaneously, without explicit exchange, by leveraging internal device conditions, which can also be referred to as local conditions internal to a device, and the inherent structure of transmitted signals.

The present disclosure also provides systems and methods for simultaneous and reproducible secure key generation based on internal device conditions and physical layer signal transformations. Both transmitting and receiving devices can independently derive a shared secure key from observable signal characteristics and local control logic. This enables decentralized, stateless key generation without coordination, exchange protocols, or cryptographic infrastructure.

Beyond secure communication, electronic devices may be configured to extract secure keying material from processed signal streams. This material, collected during the normal transformation process, may be packaged and exported (e.g., as disguised data files) for use in external encryption systems. The keying material is never stored or transmitted in an identifiable form, preserving its confidentiality. This secure key generation provides transparency where communications protected under this method leaves no signal or system trace of security measures. Further, electronic device transmissions do not alter protocol timing, increase packet size, or initiate key exchanges. From the perspective of an adversary or network monitor, electronic device transmissions are indistinguishable from ordinary communications. This secure key generation further provides simultaneous key creation and distribution where identical secure keys can be simultaneously or contemporaneously generated at multiple endpoints without prior exchange or negotiation between those endpoints. These capabilities reduce infrastructure complexity, enhance reliability, and eliminate risks associated with traditional key management. Further, these capabilities support efficient, scalable, and undetectable secure communication solutions suitable for use in commercial and mission-critical environments alike.

Figure 6B:
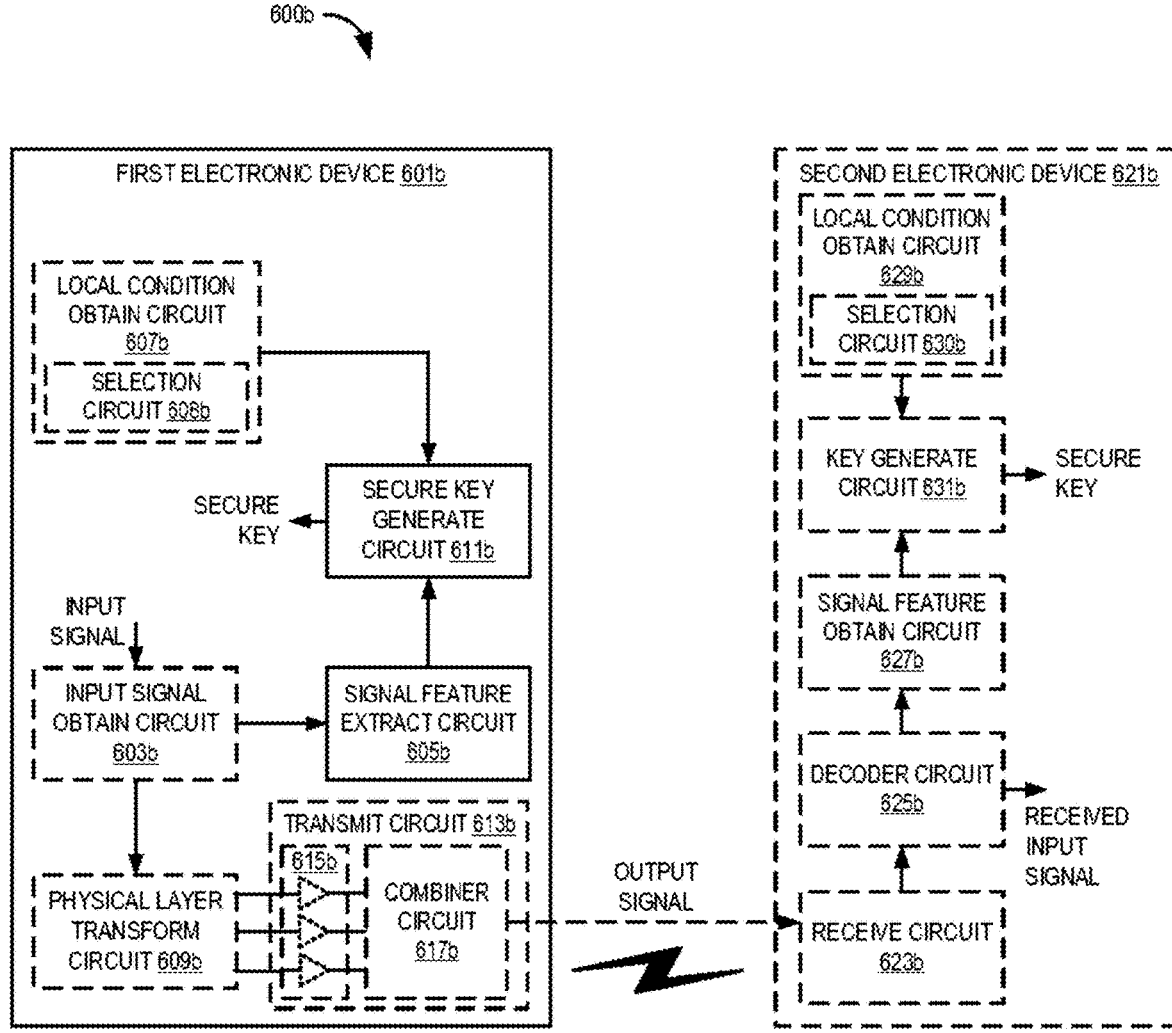
FIG. 6B illustrates one embodiment of a system of performing physical layer security with simultaneous and reproducible key generation in accordance with various aspects as described herein.

FIG. 6B illustrates one embodiment of a system 600b of performing physical layer security with simultaneous and reproducible key generation in accordance with various aspects as described herein. As shown in FIG. 6B, the system 600b can include a first electronic device 601b communicatively coupled (e.g., wired or wireless communication link) to a second electronic device 621b. The first electronic device 601b can be configured to generate and transmit a transformed input signal having embedded physical layer security, and a second electronic device 621b can be configured to receive the transformed input signal and derive the same secure key. The system 600b can enable simultaneous (or contemporaneous) reproducible key generation at both the first and second electronic devices 601b, 621b. The first electronic device 601b can include an input signal obtain circuitry 603b operable to obtain a digital representation of an input signal; a signal feature extraction circuitry 605b operable to process the digital representation of the input signal to extract a set of signal features; a local condition obtain circuitry 607b operable to obtain one or more local conditions internal to the first electronic device 601a; a physical layer transformation circuitry 609b operable to apply a physical transformation to the digital representation of the input signal; a secure key generation or derivation circuitry 611b operable to derive a secure key based on the one or more local conditions and the signal features of the input signal; the like; or any combination thereof.

In some implementations, the signal feature extract circuitry 605b can be the same as the decompose circuitry 605a described in FIG. 6A and can be configured to extract a set of signal features, such as quantized polar representations (e.g., amplitude and directional components). The transform circuitry 609b can be operable to modify the digital representation of the input signal based on a physical layer transformation, which can be selected based on one or more internal conditions, such as the state of a finite state machine, counter, or timer local of the first electronic device 601b.

In FIG. 6B, the transform circuitry 609b can perform the physical layer transformation, which may include permutation, puncturing, magnitude scaling, or the like of the digital representation of the input signal. The secure key generation circuitry 611b can generate or derive a secure key using the one or more local conditions internal to the first electronic device 601b and the extracted signal features. In certain embodiments, the secure key can be computed by hashing a vector formed from selected amplitude quantization bits and the current FSM state. The key can then be stored in a local memory of the first electronic device 601b for use in encrypting or decrypting application-layer content. The transmit circuitry 613b can be operable to output the transformed signal. The output signal can conform to expected spectral and temporal profiles and does not disclose the presence of embedded secure key generation. In some configurations, the transmit circuitry 613b can include amplifier circuitry 615b, which collectively amplifies the transformed components to suitable transmission levels. For instance, the amplifier circuitry 615b can include a set of amplifiers operable to amplify each signal component followed by a combiner circuitry 617b operable to combine, aggregate or merge the amplified signal components to obtain an output signal. Each amplifier may correspond to a distinct frequency, quantization level, or modulation path.

Furthermore, the second electronic device 621b can includes a receive circuitry 623b operable to receive a signal; a decoder circuitry 625b operable to decode the output signal based on the physical layer transformation to obtain a digital representation of a received input signal; a signal feature obtain circuitry 627b operable to obtain a set of signal features from the digital representation of the received input signal; a local condition obtain circuit 629b operable to obtain one or more local conditions internal to the second electronic device 621b; a local condition selection circuit 630b operable to select the one or more local conditions from a set of predefined local conditions internal to the electronic device that includes a state of a finite state machine, a local timer, or a counter value; a key generate circuitry 631b operable to derive a secure key based on the one or more local conditions and the signal features; the like; or any combination thereof. The receive circuitry 623b can capture the transmitted signal and forward the observed signal features to the key generation circuitry 631b. The key generation circuitry 631b can apply a reciprocal key derivation process that mirrors the transformation logic used in the first electronic device 601b. If the internal condition (e.g., FSM state) at the second electronic device 621b matches that used by the first electronic device 601b, then the derived key will match the key of the first electronic device 601b. This system 600b enables simultaneous, reproducible key generation without explicit key exchange or external synchronization. The set of signal features used for secure key generation may include: quantized amplitude levels from a polar decomposition of the signal; in-phase and quadrature values; energy patterns across frequency bins; time-domain zero-crossing intervals; transition boundaries in amplitude or phase. Each of these features is extractable at both devices and remains consistent if derived from the same underlying waveform and transformation logic. The system 600b can support reproducible key derivation across independently operating electronic devices 601b, 621b by relying on local internal conditions that evolve in a deterministic and observable manner.

In another embodiment, both electronic devices 601b, 621b can operate with a synchronized counter or FSM seeded identically at deployment. The transformation applied to the transmitted signal does not reveal the structure or timing of the key generation, making the key non-detectable from the signal alone. This system 600b enables transparent integration with standard communication protocols and secure overlay of dynamic encryption schemes.

In another embodiment, a secure key can be derived by forming a vector from selected quantized amplitude bits of the input signal's polar representation and concatenating this vector with the current FSM state of the electronic device. This combined vector can be passed through a secure hash function (e.g., SHA-256), producing a fixed-length secure key. The FSM state acts as a time-variant local condition, while the quantized amplitude values represent time-local signal features. Because both the transmitting and receiving devices have synchronized FSM states and observe identical signal components, the resulting key is reproducible and shared.

In another embodiment, a secure key can be generated by selecting the indices of active signal components (e.g., the most significant bandpass components after decomposition) and combining them with a locally maintained rolling counter value. The counter can be incremented per frame or per block transmission. The selected indices and counter value are encoded into a binary vector, which is processed through a key derivation function (KDF), yielding a secure session key.

In another embodiment, an electronic device can capture a block of quantized input signal features (e.g., top N amplitude bins across a window of samples) at a precise interval defined by a local timer offset. These features can be input to a pseudo-random number generator (PRNG) seeded by the electronic device's internal time base or oscillator phase. The output of the PRNG, when gated by the captured signal features, can form a secure key. Because the timer and sampling window are identical on both devices, the key can be generated simultaneously or contemporaneously without requiring exchange.

In another embodiment, the quantized input signal features can be mapped into histogram bins, and the bin counts can be recorded. In parallel, a local permutation selector, derived from an electronic device's internal state, can be used to reorder the bins deterministically. A cryptographic hash can be applied to the reordered bin vector to generate a secure key. This approach exploits both the structure of the observed signal and a device-specific internal transformation path, making external reconstruction of the key infeasible.

In another embodiment, the input signal can be decomposed into directional slices (e.g., constant envelope components). Based on the FSM state, an electronic device can select a subset of slices according to a predefined rule (e.g., every second slice when in even-numbered states). The amplitudes of these slices can be summed or XOR'd together and combined with a locally stored device identifier. The resulting value is then hashed to yield a session-specific secure key.

Figure 7A:
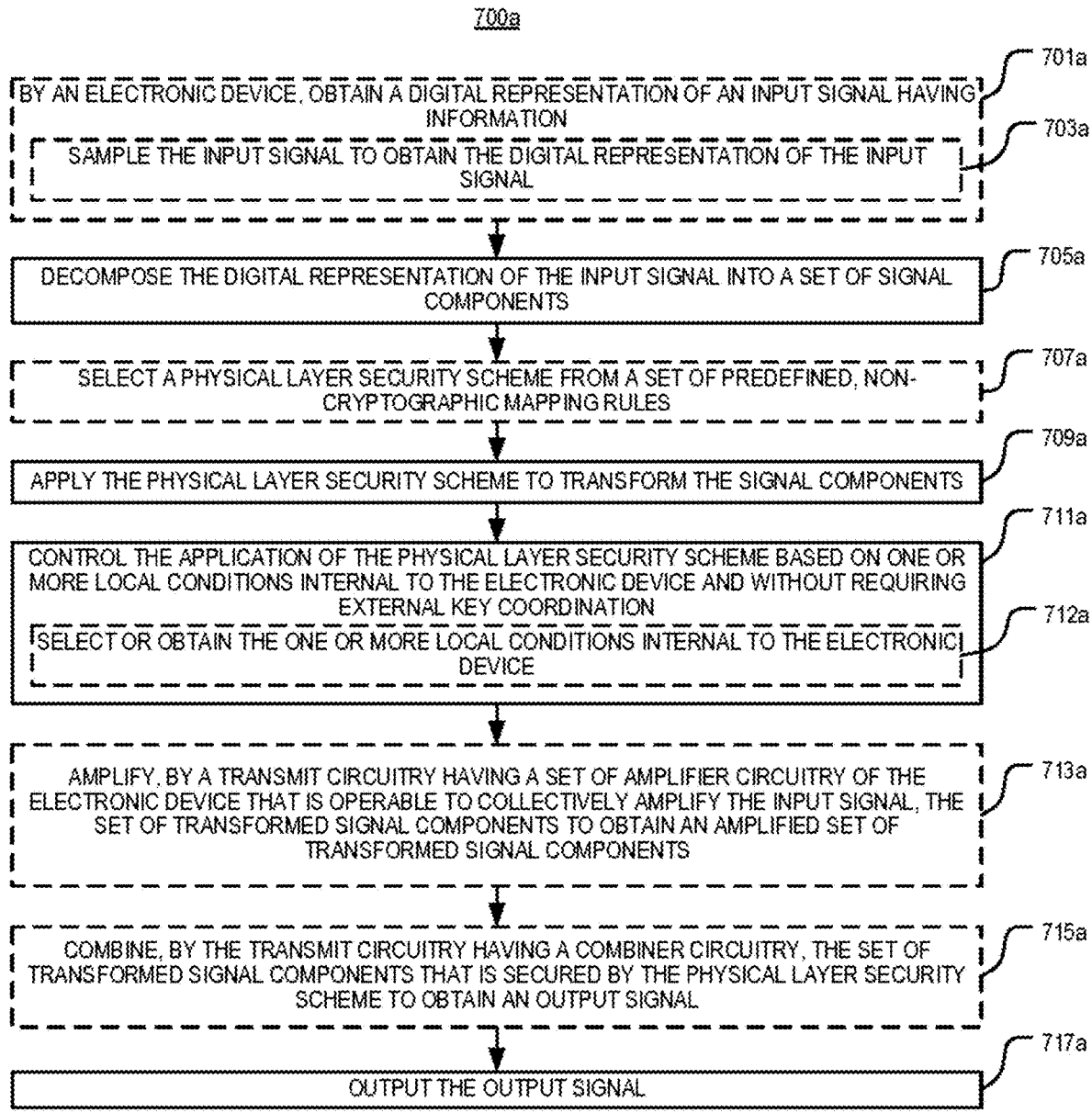
FIG. 7A illustrates one embodiment of a method performed by an electronic device of performing transparent physical layer security in accordance with various aspects as described herein.

FIG. 7A illustrates one embodiment of a method 700a performed by an electronic device of performing transparent physical layer security in accordance with various aspects as described herein. In FIG. 7A, the method 700a may start, for instance, at block 701a where it can include obtaining a digital representation of an input signal having information. For instance, the method 700a may include sampling the input signal to obtain the digital representation of the input signal, as represented by block 703a. At block 705a, the method 700a includes decomposing the digital representation of the input signal into a set of signal components. At block 707a, the method 700a can include selecting a physical layer security scheme from a set of predefined, non-cryptographic mapping rules. At block 709a, the method 700a includes applying the physical layer security scheme to transform the set of signal components to a set of transformed signal components. At block 711a, the method 700a includes controlling the application of the physical layer security scheme based on one or more local conditions internal to the electronic device and without requiring external key coordination. At block 712a, the method 700a can include selecting or obtaining the one or more local conditions internal to the electronic device. At block 713a, the method 700a can include amplifying, by a transmit circuitry having a set of amplifier circuitry of the electronic device that is operable to collectively amplify the input signal, the set of transformed signal components to obtain an amplified set of transformed signal components. At block 715a, the method 700a can include combining, by the transmit circuitry having a combiner circuitry, the set of transformed signal components that is secured by the physical layer security scheme to obtain an output signal. At block 717a, the method 700a includes outputting the output signal.

Figure 7B:
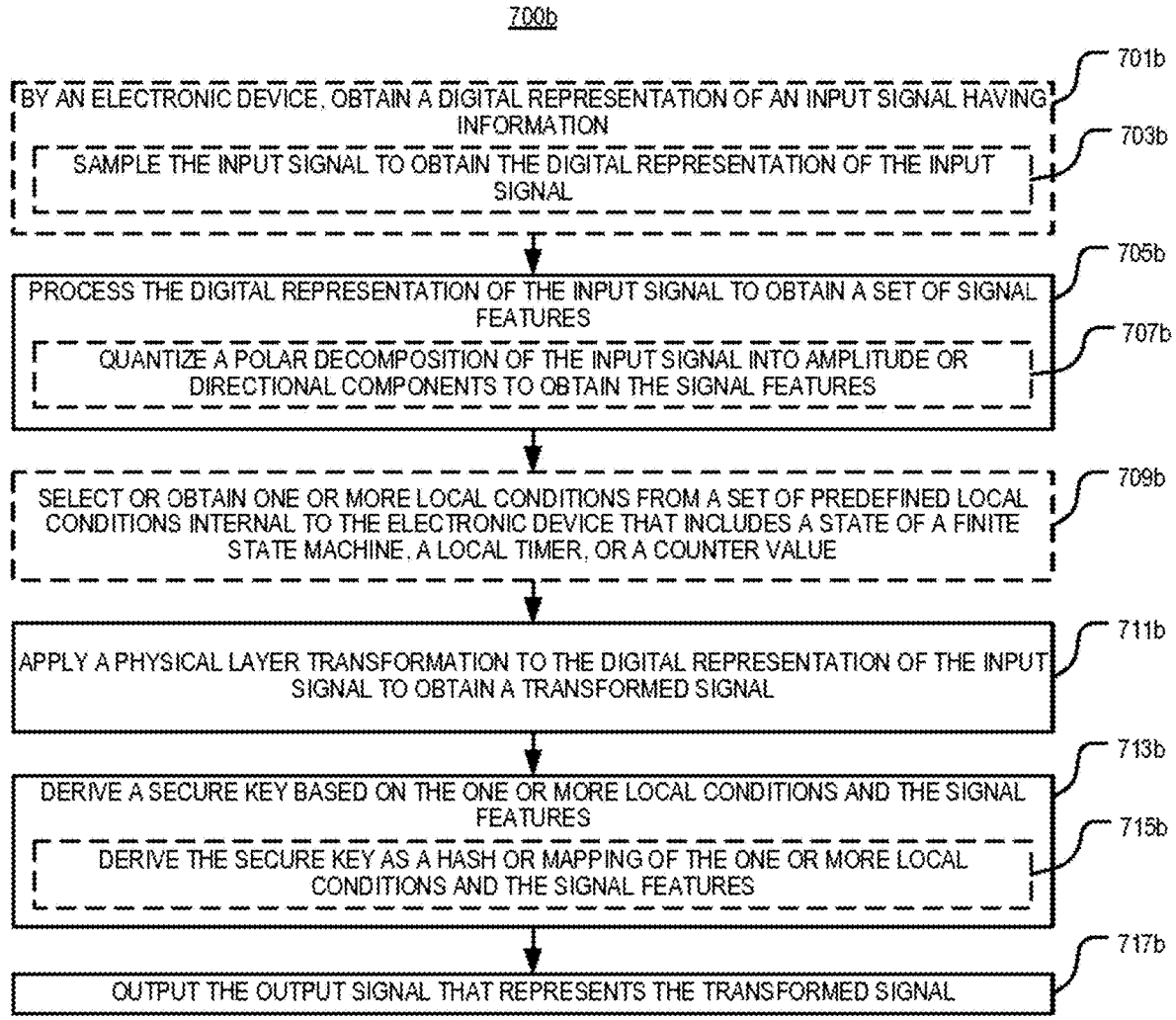
FIG. 7B illustrates one embodiment of a method performed by an electronic device of performing physical layer security with simultaneous and reproducible key generation in accordance with various aspects as described herein.

FIG. 7B illustrates one embodiment of a method 700b performed by an electronic device of performing physical layer security with simultaneous and reproducible key generation in accordance with various aspects as described herein. In FIG. 7B, the method 700b may start, for instance, at block 701b where it can include obtaining a digital representation of an input signal having information. For instance, the method 700b can include sampling the input signal to obtain the digital representation of the input signal, as represented by block 703b. At block 705b, the method 700b includes processing the digital representation of the input signal to generate a set of signal features. For instance, the method 700b can include quantizing a polar decomposition of the input signal into amplitude or directional components to obtain the signal features, as represented by block 707b. At block 709b, the method 700b can include selecting or obtaining one or more local conditions such as from a set of predefined local conditions internal to the electronic device that includes a state of a finite state machine, a local timer, or a counter value. At block 711b, the method 700b includes applying a physical layer transformation to the digital representation of the input signal based on the one or more local conditions internal to the electronic device to obtain a transformed signal.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one exemplary embodiment, a method of physical layer security for codified amplification includes receiving input signal samples $s_n$ of a baseband signal $s_n=s(t_n)=s_{I,n}+js_{Q,n}$, where $s_{I,n}$ and $s_{Q,n}$ represent the respective in-phase and quadrature-phase component of each sample $s_n$, and $t_n$ is the sampling instant. The method includes receiving clock reference signals associated with a carrier frequency $f_c$, a sampling rate $f_s$, or an intermediate frequency $f_i$. The method further includes determining, for each sample $s_n$, an amplitude $$A_n = |s_n| = \sqrt{s_{I,n}^2 + js_{Q,n}^2},$$

and a phase $$\alpha_n = \tan^{-1}\left(\frac{s_{Q,n}}{s_{I,n}}\right)$$

of that sample $s_n$. The method further includes quantizing the amplitude $A_n$ as $A_{qn}=A_n+e_q$, where $e_q$ denotes the quantization error of that sample $s_n$ based on a quantization table with $N_b$ bits, a table with the finite set of quantization values, and a table with the discrete amplitudes of quantization components $a_i=\{a_1, a_2, \ldots, a_{N_b}\}$, with $N_b=N_b$ or $N_b=N_b+1$, in which the quantized value is decomposed, and based on an amplitude quantization error $e_q$ computing a compensation factor $\Delta$ belonging to a finite discrete alphabet. The method further includes determining a mapping table with a set of mapping codes $M_t=\{M_0; \ldots; M_{N_c}\}$ with $N_c=2^{N_b}-1$, based on the magnitude $A_q$, the phase $a_n$, the quantization error compensation factor $\Delta$ and the quantization table, which are associated with the sets of mapping coefficients values $C_{N_b}^{(0)} \ldots C_1^{(0)}, \ldots, C_{N_b}^{(N_c)} \ldots C_1^{(N_c)}$, with $N_b$=$N_b$ or $N_b$=$N_b$+1, which are defined in terms of mapping coefficients $$C_k = \{C_k^{(1)}; \ldots; C_k^{(N_c)}\},$$

with $k=1, \ldots, N_b$, with the mapping coefficient values belonging to finite alphabets $A_k$. The method further includes selecting, based on the coded mapping table and the quantization table, a security scheme based on permutations of mapping codes or phase rotation or puncturing of mapping codes or scale factor multiplication to be applied in generating secure mapping table with secure mapping codes and mapping coefficients. The method further includes performing a secure mapping that applies the secure mapping table with mapping coefficients $C'_k$ where $k=1, \ldots, N_b$, with $N_b$=$N_b$ or $N_b$=$N_b$+1, to determine secure mapping tables with new mapping coefficients $C'_k$ to enable security on mapping the quantized value into a maximum number $N' \le N_b$ of active pairs of in-phase $s_{I,n}$ and quadrature-phase $s_{Q,n}$ components related to $N' \le N_b$ active mapping components given by $C'_k \cos(a_n)$ and $C'_k \sin(a_n)$. The method further includes mapping the quantized value into N' active mapping components and generating N' active bandpass components.

In another exemplary embodiment, the method can further include a set of LUTs that include the mapping table, the secure mapping table, the security scheme, the quantization table, the sets of discrete amplitudes $a_i$, or the set of quantization values.

In another exemplary embodiment, the maximum number of possible bandpass components and mapping coefficients $C'_k$ can be $N_b$, and the coefficients $C'_k$ can represent values from $N_b$ discrete alphabets In another exemplary embodiment, the maximum number of possible bandpass components or mapping coefficients $C'_k$ can be $N_b$+1 for $N_b$ quantization bits and coefficients $C'_k$ can represent values from $N_b$+1 discrete alphabets.

In another exemplary embodiment, the bandpass modulator circuitry can be operable to receive the secure mapping coefficients to generate the bandpass components according to the secure mapping table.

In another exemplary embodiment, the set of active bandpass components can be generated at a carrier frequency $f_c$ or an intermediate frequency $f_i$.

In another exemplary embodiment, the method can further include generating numerical sequences having the positions of the samples to which the security schemes are applied.

In another exemplary embodiment, the numerical sequences can be stored in one or more LUTs.

In another exemplary embodiment, the method can further include generating pairs of in-phase and quadrature-phase mapping components and providing active pairs of mapping components to the corresponding bandpass modulator circuitry.

In another exemplary embodiment, the security scheme can be based on permutations of mapping codes and corresponding mapping coefficients.

In another exemplary embodiment, the security scheme can be based on phase rotations of the mapping coefficients associated with the mapping codes that can affect all or a subset of the mapping codes.

In another exemplary embodiment, the security scheme can be based on a scale factor multiplication of the mapping coefficients associated with the mapping codes that can affect all or a sub-set of mapping codes; or In another exemplary embodiment, the security scheme can be based on puncturing of the mapping codes and the corresponding mapping coefficients.

In another exemplary embodiment, the security scheme can include permutations, puncturing, phase rotation and scale factor multiplication of mapping codes, the like, or any combination thereof.

In another exemplary embodiment, the security scheme can be applied at the same time or applied separately to different samples or subsets of samples.

In another exemplary embodiment, any of the security schemes can be combined with interleaving techniques affecting the sequence of samples of the input signal.

In another exemplary embodiment, the method can further include determining control information to activate or deactivate bandpass modulator circuitry associated with the mapping components based on the secure mapping table.

In another exemplary embodiment, the method can further include receiving samples $s_n$ of a baseband signal $s(t)$ and generating in-phase $s_{In}$ and quadrature-phase $s_{Qn}$ components of the samples $s_n$.

In another embodiment, the method can further include receiving a baseband signal and sampling, by a sampling circuitry or in a sample and hold (S/H) circuitry, the baseband signal to obtain samples of the baseband signal.

In another embodiment, the bandpass modulator circuitry can be I/Q modulator circuitry or I/Q DAC circuitry.

In another exemplary embodiment, the method can further include determining the amplitude $A_n$ of the sample, quantizing the amplitude $A_n$ to obtain the quantized amplitude $A_{qn}$ of the sample, generating the mapping table, generating the secure mapping table, generating the control information, and generating the secure mapping of $N' \le N_b$ active pairs of in-phase and quadrature-phase components can be performed in a single method step.

In one exemplary embodiment, an apparatus configured to perform physical layer security for codified amplification includes an input circuitry operable to receive samples $s_n$ of a baseband signal $s_n = s(t_n) = s_{I,n} + js_{Q,n}$, where $s_{I,n}$ and $s_{Q,n}$ represent the respective in-phase and quadrature-phase components of each sample $s_n$ and $t_n$ is the sampling instant. The input circuitry is also operable to receive clock reference signals associated with a carrier frequency $f_c$, a sampling rate $f_s$, or an intermediate frequency $f_i$. The apparatus further includes a quantizer circuitry operable to, for each sample $s_n$, determine an amplitude $$A_n = |s_n| = \sqrt{s_{I,n}^2 + js_{Q,n}^2},$$

and a phase $$\alpha_n = \tan^{-1}\left(\frac{s_{Q,n}}{s_{I,n}}\right)$$

of that sample $s_n$. The quantizer circuitry is further operable to quantizing the amplitude $A_n$ as $A_{qn}=A_n+e_q$, where $e_q$ denotes the quantization error of that sample $s_n$ based on a quantization table with $N_b$ bits, a table with the finite set of quantization values, and a table with the discrete amplitudes of quantization components $a_i=\{a_1, a_2, \ldots, a_{N_b}\}$, with $N_b=N_b$ or $N_b=N_b+1$, in which the quantized value is decomposed, and based on an amplitude quantization error $e_q$ computing a compensation factor $\Delta$ belonging to a finite discrete alphabet. The apparatus further includes a mapper circuitry operable to determine a mapping table having a set of mapping codes $M_i=\{M_0; \ldots; M_{N_c}\}$ with $N_c=2^{N_b}-1$, based on the magnitude $A_q$, the phase $a_n$, the quantization error compensation factor $\Delta$ and the quantization table, which are associated with the sets of mapping coefficients values $$C_{N_b}^{(0)} \ldots C_1^{(0)}, \ldots, C_{N_b}^{(N_c)} \ldots C_1^{(N_c)},$$

with $N_b=N_b$ or $N_b=N_b+1$, which are defined in terms of mapping coefficients $$C_k = \{C_k^{(1)}; \ldots ; C_k^{(N_c)}\},$$

with $k=1, \ldots, N_{b'}$, with the mapping coefficient values belonging to finite alphabets $A_k$. The apparatus further includes a secure mapper circuitry operable to receive the mapping table having mapping codes and mapping coefficients and selects the security scheme to apply towards determining secure mapping coefficients $C'_k$, $k=1, \ldots, N_{b'}$, and to determine secure mapping tables having new mapping coefficients $C'_k$ required to enable security on mapping the quantized value to a maximum number $N' \leq N_b$ of active pairs of in-phase $s_{I,n}$ and quadrature-phase $s_{Q,n}$ components related to $N' \leq N_b$ active mapping components given by $C'_k \cos(a_n)$ and $C'_k \sin(a_n)$. Further, the secure mapper circuitry is operable to determine a set of $N' \leq N_b$ active pairs of in-phase and quadrature-phase mapping components according to the secure mapping table. In addition, the secure mapper circuitry is operable to generate numerical sequences having the positions of the samples to which the security schemes are applied in the generation of the bandpass components. The secure mapping circuitry is also operable to provide $N' \leq N_b$ active pairs of in-phase and quadrature-phase mapping components to a set of N' bandpass modulator circuitry, which can be I/Q modulator circuitry or I/Q DAC circuitry, operable to generate the N' active bandpass components. The apparatus also includes a set of $N_{b'}$ bandpass modulator circuitry with each being operable to receive the active N' pairs of in-phase and quadrature-phase mapping components and generate N' active bandpass components having the carrier frequency $f_c$.

In one exemplary embodiment, a method is performed by an electronic device. The method includes outputting an output signal that represents a set of pairs of in-phase and quadrature-phase mapping components mapped from a set of mapping codes and corresponding sets of mapping coefficients based on a set of quantization bits that represents a quantized amplitude of a sample of an input signal having information and a phase of the input signal sample. Further, the set of pairs of in-phase and quadrature-phase mapped components collectively represent the input signal sample. Each mapping code corresponds to a certain set of the sets of mapping coefficients with at least one mapping coefficient in each set of mapping coefficients being related to a set of discrete amplitudes that correspond to the set of quantization bits.

In another exemplary embodiment, the method can further include quantizing the amplitude of the input signal sample to obtain the set of quantization bits that represents the quantized amplitude of the input signal sample.

In another exemplary embodiment, the method can further include mapping the set of quantization bits that represents the quantized amplitude of the input signal sample and the phase of the input signal sample to obtain the set of pairs of in-phase and quadrature-phase mapped components based on the set of mapping codes and the corresponding sets of mapping coefficients.

In another exemplary embodiment, the method can further include determining the set of mapping codes or the sets of mapping coefficients based on the set of quantization bits that represents the quantized amplitude of the input signal sample, the phase of the input signal sample, or the set of discrete amplitudes that corresponds to the set of quantization bits.

In another exemplary embodiment, the method can further include selecting a physical layer security scheme to apply to the set of mapping codes or the sets of mapping coefficients; or applying the physical layer security scheme to the set of mapping codes or the sets of mapping coefficients.

In another exemplary embodiment, the physical layer security scheme can include applying a scale factor or a phase rotation to the sets of mapping coefficients.

In another exemplary embodiment, the method can further include determining an amplitude quantization error of the input signal sample based on the amplitude of the input signal sample and the quantized amplitude of the input signal sample; determining an amplitude quantization error compensation factor based on the amplitude quantization error; determining the set of mapping coefficients based on the set of quantization bits that represents the quantized amplitude of the input signal sample, the phase of the input signal sample and the amplitude quantization compensation factor of the input signal sample; or wherein the mapping step includes mapping the set of quantization bits that represents the quantized amplitude of the input signal sample, the phase of the input ample and the amplitude quantization error compensation factor of the input signal sample to obtain the set of pairs of in-phase and quadrature-phase mapped components based on the set of mapping codes and the corresponding sets of mapping coefficients.

In another exemplary embodiment, the method can further include modulating, by a set of modulator circuitry, the set of pairs of in-phase and quadrature-phase mapped components to obtain a set of modulated signals; or combining, by a combiner circuitry, the set of modulated signals to obtain the output signal.

In one exemplary embodiment, an electronic device is operable to output an output signal that represents a set of pairs of in-phase and quadrature-phase mapped components mapped from a set of mapping codes and corresponding sets of mapping coefficients based on a set of quantization bits that represents a quantized amplitude of a sample of an input signal having information and a phase of the input signal sample. Further, the set of pairs of in-phase and quadrature-phase mapped components collectively represent the input signal sample and each mapping code corresponds to a certain set of the sets of mapping coefficients with at least one mapping coefficient in each set of secured mapping coefficients being related to a set of discrete amplitudes that correspond to the set of quantization bits.

In another exemplary embodiment, the electronic device can further include a quantizer circuitry operable to quantize the amplitude of the input signal sample to obtain the set of quantization bits that represents the quantized amplitude of the input signal sample.

In another exemplary embodiment, the electronic device can further include a mapper circuitry operable to map the set of quantization bits that represents the quantized amplitude of the input signal sample and the phase of the input signal sample to obtain the set of pairs of in-phase and quadrature-phase mapped components based on the set of mapping codes and the corresponding sets of mapping coefficients.

In another exemplary embodiment, the electronic device can further include a mapping coefficient determination circuitry operable to determine the set of mapping codes or the sets of mapping coefficients based on the set of quantization bits that represents the quantized amplitude of the input signal sample, the phase of the input signal sample, or the set of discrete amplitudes that corresponds to the set of quantization bits.

In another exemplary embodiment, the electronic device can further include a physical layer security scheme selection circuitry operable to select a physical layer security scheme to apply to the set of mapping codes or the sets of mapping coefficients; or a physical layer security scheme application circuitry operable to apply the physical layer security scheme to the set of mapping codes or the sets of mapping coefficients.

In another exemplary embodiment, the electronic device can further include a quantization error determination circuitry operable to determine an amplitude quantization error of the input signal sample based on the amplitude of the input signal sample and the quantized amplitude of the input signal sample; a compensation factor determination circuitry operable to determine an amplitude quantization error compensation factor of the input signal sample based on the amplitude quantization error; a mapping coefficient determination circuitry operable to determine the set of mapping coefficients based on the set of quantization bits that represents the quantized amplitude of the input signal sample, the phase of the input signal sample and the amplitude quantization compensation factor of the input signal sample; or a mapper circuitry operable to map the set of quantization bits that represents the quantized amplitude of the input signal sample, the phase of the input signal sample and the amplitude quantization error compensation factor of the input signal sample to obtain the set of pairs of in-phase and quadrature-phase mapped components based on the set of mapping codes and the corresponding sets of mapping coefficients.

In one exemplary embodiment, an electronic device includes a quantizer circuitry operable to quantize an amplitude of a sample of an input signal having information to obtain a set of quantization bits that represent the quantized amplitude of the input signal sample; a mapping coefficient determination circuitry operable to determine a set of mapping coefficients based on the set of quantization bits that represents the quantized amplitude of the input signal sample and the phase of the input signal sample; a physical layer security scheme selection circuitry operable to select a physical layer security scheme to apply to the set of pairs of in-phase and quadrature-phase mapped components; a physical layer security scheme application circuitry operable to apply the physical layer security scheme to the set of mapping codes or the sets of mapping coefficients; a mapper circuitry operable to map the set of quantization bits that represents the quantized amplitude of the input signal sample and the phase of the input signal sample to obtain the set of pairs of in-phase and quadrature-phase mapped components based on the set of mapping codes and the corresponding sets of mapping coefficients; a set of modulator circuitry operable to modulate the set of pairs of in-phase and quadrature-phase mapped components to obtain a set of modulated signals; and a combiner circuitry operable to combine the set of modulated signals to obtain an output signal.

In one exemplary embodiment, a method is performed by an electronic device having a first circuitry electrically coupled to a set of amplifier circuitry operable to collectively amplify an input signal having information. The method includes outputting, by the first circuitry, a set of bandpass components that is secured by a physical layer security scheme to obtain a secured set of bandpass components. Further, the secured set of bandpass components collectively represent a sample of the input signal and correspond to both the set of amplifier circuitry and a quantized polar representation of the input signal sample.

In another exemplary embodiment, each bandpass component is associated with one of a set of quantization bits that represents a quantized amplitude of the polar representation of the input signal sample.

In another exemplary embodiment, at least one amplifier circuitry is configured to output power that is linearly proportional to another of the set of amplifier circuitry or at least one amplifier circuitry is configured to output power that is non-linearly proportional to another of the set of amplifier circuitry.

In another exemplary embodiment, the method includes applying the physical layer security scheme to a set of mapping codes based on the quantized polar representation of the input signal sample to obtain a secured set of mapping codes and obtaining the secured set of bandpass components based on the secured set of mapping codes.

In another exemplary embodiment, the physical layer security scheme is associated with a permutation of at least one of a set of mapping codes that corresponds to the secured set of bandpass components.

In another exemplary embodiment, the physical layer security scheme is associated with a puncture of at least one of a set of mapping codes that corresponds to the secured set of bandpass components.

In another exemplary embodiment, the physical layer security scheme is associated with a scale factor or a phase rotation applied to at least one of a set of mapping codes that corresponds to the secured set of bandpass components.

In another exemplary embodiment, each bandpass component corresponds to one of the set of amplifier circuitry, one of a set of quantization bits that represents a quantized amplitude of the polar representation of the input signal sample, and/or a phase of the polar representation of the input signal sample.

In one exemplary embodiment, an electronic device includes a set of amplifier circuitry operable to collectively amplify an input signal having information and a first circuitry electrically coupled to the set of amplifier circuitry and operable to output a set of bandpass components that is secured by a physical layer security scheme to obtain a secured set of bandpass components. Further, the secured set of bandpass components collectively represents a sample of the input signal and corresponds to both the set of amplifier circuitry and a quantized polar representation of the input signal sample.

In another exemplary embodiment, the first circuitry is further operable to apply the physical layer security scheme to a set of mapping codes based on the quantized polar representation of the input signal sample to obtain a secured set of mapping codes and obtain the secured set of bandpass components based on the secured set of mapping codes.

In one exemplary embodiment, a method performed by an electronic device having a set of amplifier circuitry includes amplifying, by the set of amplifier circuitry, a set of output signals that collectively represents an amplified sample of an input signal having information. Further, the set of output signals corresponds to a set of bandpass components that is secured by a physical layer security scheme and is associated with a quantized polar representation of the input signal sample.

In another exemplary embodiment, each output signal is associated with one of a set of quantization bits that represents a quantized amplitude of the polar representation of the sample.

In another exemplary embodiment, at least one amplifier circuitry is configured to output power that is linearly proportional to another of the set of amplifier circuitry or at least one amplifier circuitry is configured to output power that is non-linearly proportional to another of the set of amplifier circuitry.

In another exemplary embodiment, the method further includes applying the physical layer security scheme to a set of mapping codes based on the quantized polar representation of the input signal sample to obtain a secured set of mapping codes and obtaining the secured set of bandpass components based on the secured set of mapping codes.

In another exemplary embodiment, each output signal corresponds to one of the set of amplifier circuitry, one of a set of quantization bits that represents a quantized amplitude of the polar representation of the input signal sample, and a phase of the polar representation of the input signal sample.

In one exemplary embodiment, an electronic device includes a set of amplifier circuitry operable to output a set of output signals that collectively represents an amplified sample of an input signal having information. Further, the set of output signals corresponds to a set of bandpass components that is secured by a physical layer security scheme and is associated with a quantized polar representation of the input signal sample.

In another exemplary embodiment, the device further includes a first circuitry electrically coupled to the set of amplifier circuitry and operable to apply the physical layer security scheme to a set of mapping codes based on the quantized polar representation of the input signal sample to obtain a secured set of mapping codes and obtain the secured set of bandpass components based on the secured set of mapping codes.

According to one aspect, a method is performed by an electronic device. The method includes decomposing a digital representation of an input signal into a set of signal components. The method also includes applying a physical layer security scheme to transform the signal components. The method further includes controlling the application of the physical layer security scheme based on one or more local conditions internal to the electronic device and without requiring external key coordination. The method also includes generating and transmitting an output signal based on the transformed signal components.

According to another aspect, the method includes selecting the physical layer security scheme from a set of predefined, non-cryptographic mapping rules.

According to another aspect, the set of predefined, non-cryptographic mapping rules includes at least one of permutation, puncturing, phase rotation, or scale factor modification.

According to another aspect, the method includes amplifying the signal by a transmit circuitry that includes a set of amplifier circuitry operable to collectively amplify the signal, and outputting, by the transmit circuitry, a set of bandpass components that is secured by the physical layer security scheme to obtain a secured set of bandpass components. The secured set of bandpass components collectively represents the digital representation of the input signal and corresponds to both the set of amplifier circuitry and a quantized polar representation of the digital representation of the signal.

According to another aspect, the method includes associating each bandpass component with one of a set of quantization bits that represents a quantized amplitude of the polar representation of the digital representation of the input signal.

According to another aspect, the method includes selecting the physical layer security scheme using a finite state machine configured to switch among predefined mapping rules.

According to another aspect, the method includes dynamically changing the physical layer security scheme across signal samples or blocks without modifying the format or timing of the output signal.

According to another aspect, the method includes applying the physical layer security scheme by permuting associations between signal components and mapping coefficients.

According to another aspect, the method includes applying the physical layer security scheme by puncturing a subset of mapping coefficients corresponding to selected signal components.

According to another aspect, the method includes generating the digital representation by sampling a baseband input signal.

According to one aspect, an electronic device includes a decompose circuitry configured to decompose a digital representation of a signal into a set of signal components. The device further includes a transform circuitry configured to apply a security transformation to the signal components using a physical layer security scheme, where the scheme alters the structure of the signal components. A control circuitry is configured to control the application of the physical layer security scheme based on one or more local conditions internal to the device and without requiring external key coordination. A transmit circuitry is configured to generate and transmit an output signal derived from the transformed signal components.

According to another aspect, the electronic device includes a generate circuitry configured to generate the digital representation of the signal based on a sampled baseband input signal.

According to another aspect, the electronic device includes a transmit circuitry having a set of amplifier circuitry operable to collectively amplify the signal. The transmit circuitry is further configured to output a set of bandpass components that is secured by the physical layer security scheme to obtain a secured set of bandpass components. The secured set of bandpass components collectively represents the digital representation of the input signal and corresponds to both the set of amplifier circuitry and a quantized polar representation of the digital representation of the signal.

According to another aspect, the transform circuitry of the electronic device is further configured to perform permutations on a set of mapping codes associated with the signal components.

According to another aspect, the transform circuitry of the electronic device is further configured to puncture a subset of mapping coefficients corresponding to selected signal components.

According to another aspect, the transmit circuitry is further configured to output a signal that conforms to a standard communication protocol and conceals the presence of the applied physical layer security scheme.

According to another aspect, a system includes first and second electronic devices. The first electronic device includes a decompose circuitry configured to decompose a digital representation of an input signal into a set of signal components. The first electronic device also includes a transform circuitry configured to apply a security transformation to the signal components using a physical layer security scheme. The physical layer security scheme is configured to alter the structure of the signal components without modifying their format in a way that is detectable at the communication protocol level. The first electronic device further includes a control circuitry configured to control the application of the physical layer security scheme based on one or more local conditions internal to the first electronic device and without requiring external key coordination. The first electronic device also includes a transmit circuitry configured to generate and transmit an output signal derived from the transformed signal components. The second electronic device includes a receive circuitry configured to receive the output signal transmitted by the first electronic device. The second electronic device also includes an identify circuitry configured to identify or retrieve the corresponding physical layer security scheme based on local conditions or shared state. The second electronic device further includes a decode circuitry configured to apply the physical layer security scheme to decode the signal components and reconstruct a representation of the input signal.

According to another aspect, a method is provided. The method includes processing a digital representation of a signal to generate a set of signal features by a first electronic device. The method also includes applying a physical layer transformation to the signal based on a selected internal condition, transmitting an output signal incorporating the transformation, and simultaneously generating a secure key based on the selected internal condition and the signal features.

According to another aspect, the method includes selecting the internal condition from a set of predefined conditions such as a finite state machine state, a local timer, or a counter value.

According to another aspect, the method includes quantizing the signal features using a polar decomposition of the signal into amplitude and directional components.

According to another aspect, the method includes deriving the secure key as a hash or mapping of the selected internal condition and a subset of quantized amplitude levels.

According to another aspect, the method includes updating the secure key periodically or at each communication frame or cycle.

According to another aspect, the method includes storing the secure key in a memory associated with the electronic device for use in securing application-layer communications.

According to another aspect, the method includes applying a physical layer transformation that is configured such that the presence of key generation activity is not detectable from characteristics of the transmitted signal.

According to another aspect, the method includes configuring the physical layer transformation and internal condition to enable reproducible generation of the secure key without requiring explicit coordination between devices.

According to another aspect, the method includes using the secure key to symmetrically encrypt a subsequent communication block.

According to one aspect, an electronic device includes a signal processor circuitry configured to generate a set of signal features from a digital representation of an input signal. The device also includes a transform circuitry configured to apply a physical layer transformation to the signal based on a selected internal condition. The device further includes a key generation circuitry configured to derive a secure key from the selected internal condition and the signal features. A transmit circuitry is configured to output a transformed signal that includes the applied transformation.

According to another aspect, the electronic device includes a memory configured to store the secure key for use in encrypting or decrypting secure data.

According to another aspect, the transform circuitry is configured to preserve the spectral and temporal properties of the signal such that the presence of key generation is concealed.

According to another aspect, the secure key is generated based on conditions that enable reproducibility without requiring explicit exchange of synchronization data.

According to another aspect, the key generation circuitry is further configured to compute a reciprocal transformation usable to reproduce the secure key.

According to one aspect, a system includes a first electronic device having a signal processor circuitry configured to generate a set of signal features from a digital representation of an input signal, a transform circuitry configured to apply a physical layer transformation based on a selected internal condition, a key generation circuitry configured to derive a secure key from the selected internal condition and the signal features, and a transmit circuitry configured to output a transformed signal. The system also includes a second electronic device having a receive circuitry configured to receive the transformed signal and a key generation circuitry configured to apply a reciprocal operation to derive the secure key based on a locally derived version of the internal condition and a matching set of signal features.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuitry), or any combination thereof to control a computing device to implement the disclosed subject matter. It will be appreciated that some embodiments may be comprised of one or more generic or specialized processors such as microprocessors, digital signal processors, customized processors and FPGAs and unique stored program instructions (including both software and firmware) that control the one or more processors to implement, in conjunction with certain non-processor circuitry, some, most, or all of the functions of the methods, devices and systems described herein. Alternatively, some or all functions could be implemented by a state machine that has no stored program instructions, or in one or more ASICs, in which each function or some combinations of certain of the functions are implemented as custom logic circuitry. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a CD or DVD; a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a LAN. Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:
   by an electronic device,
   decomposing a digital representation of an input signal into a set of signal components;
   applying a physical layer security scheme to transform the set of signal components to a set of transformed signal components that is secured by the physical layer security scheme, the physical layer security scheme being configured to alter a structure of the set of signal components with the set of transformed signal components collectively representing the digital representation of the input signal;
   controlling the application of the physical layer security scheme based on one or more local conditions internal to the electronic device and without requiring external key coordination;
   amplifying, by a transmit circuitry of the electronic device that includes a set of amplifier circuitry, the set of transformed signal components to obtain an amplified set of transformed signal components that is secured by the physical layer security scheme, the amplified set of transformed signal components collectively representing the digital representation of the input signal and corresponding to both the set of amplifier circuitry and a quantized polar representation of the digital representation of the input signal; and
   outputting an output signal derived from the amplified set of transformed signal components.

2. The method of claim 1, further including:
   selecting the physical layer security scheme from a set of predefined, non-cryptographic mapping rules.

3. The method of claim 2, wherein the set of predefined, non-cryptographic mapping rules includes at least one of permutation, puncturing, phase rotation, or scale factor modification.

4. The method of claim 1, wherein each transformed signal component is associated with one of a set of quantization bits that represents a quantized amplitude of the polar representation of the digital representation of the input signal.

5. The method of claim 1, wherein the physical layer security scheme is selected using a finite state machine configured to switch among predefined mapping rules.

6. The method of claim 1, wherein the physical layer security scheme is dynamically changed across signal samples or blocks without modifying the format or timing of the output signal.

7. The method of claim 1, wherein the step of applying the physical layer security scheme includes permuting associations between signal components and mapping coefficients.

8. The method of claim 1, wherein the step of applying the physical layer security scheme includes puncturing a subset of mapping coefficients corresponding to selected signal components.

9. The method of claim 1, further including:
   generating the digital representation by sampling a baseband input signal.

10. An electronic device, comprising:
- a decompose circuitry configured to decompose a digital representation of an input signal into a set of signal components;
- a transform circuitry configured to apply a physical layer security scheme to transform the set of signal components to a set of transformed signal components that is secured by the physical layer security scheme, the physical layer security scheme being configured to alter a structure of the set of signal components with the set of transformed signal components collectively representing the digital representation of the input signal;
- a control circuitry configured to control the application of the physical layer security scheme based on one or more local conditions internal to the device and without requiring external key coordination; and
- a transmit circuitry having a set of amplifier circuitry and configured to:
  - amplify the set of transformed signal components to obtain an amplified set of transformed signal components that is secured by the physical layer security scheme, the amplified set of transformed signal components collectively representing the digital representation of the input signal and corresponding to both the set of amplifier circuitry and a quantized polar representation of the digital representation of the input signal; and
  - output an output signal derived from the amplified set of transformed signal components.

11. The electronic device of claim 10, wherein the physical layer security scheme is selected from a set of predefined, non-cryptographic mapping rules.

12. The electronic device of claim 11, wherein the set of predefined, non-cryptographic mapping rules includes at least one of permutation, puncturing, phase rotation, or scale factor modification.

13. The electronic device of claim 10, further including:
- a generate circuitry configured to generate the digital representation of the input signal based on a sampled baseband input signal.

14. The electronic device of claim 10, wherein each transformed signal component is associated with one of a set of quantization bits that represents a quantized amplitude of the polar representation of the digital representation of the input signal.

15. The electronic device of claim 10, wherein the transform circuitry is further configured to perform permutations on a set of mapping codes associated with the signal components.

16. The electronic device of claim 10, wherein the transform circuitry is further configured to puncture a subset of mapping coefficients corresponding to selected signal components.

17. The electronic device of claim 10, wherein the transmit circuitry is further configured to output a signal that conforms to a standard communication protocol and conceals the presence of the applied physical layer security scheme.

18. A system, comprising:
- a first electronic device, including:
  - a decompose circuitry configured to decompose a digital representation of a signal into a set of signal components;
  - a transform circuitry configured to apply a physical layer security scheme to transform the set of signal components to a set of transformed signal components that is secured by the physical layer security scheme, the physical layer security scheme being configured to alter a structure of the set of signal components with the set of transformed signal components collectively representing the digital representation of the input signal;
  - a control circuitry configured to control the application of the physical layer security scheme based on one or more local conditions internal to the first electronic device and without requiring external key coordination; and
  - a transmit circuitry having a set of amplifier circuitry and configured to:
    - amplify the set of transformed signal components to obtain an amplified set of transformed signal components that is secured by the physical layer security scheme, the amplified set of transformed signal components collectively representing the digital representation of the input signal and corresponding to both the set of amplifier circuitry and a quantized polar representation of the digital representation of the input signal; and
    - output an output signal derived from the amplified set of transformed signal components; and
- a second electronic device, including:
  - a receive circuitry configured to receive the output signal transmitted by the first electronic device;
  - an identify circuitry configured to identify or retrieve the corresponding physical layer security scheme based on the one or more local conditions internal to the second electronic device and without requiring external key coordination; and
  - a decode circuitry configured to decode the output signal based on the physical layer security scheme to obtain a decoded set of signal components and reconstruct a representation of the input signal based on the decoded set of signal components.

* * * * *